US011871271B2

(12) United States Patent
Gundavelli et al.

(10) Patent No.: US 11,871,271 B2
(45) Date of Patent: *Jan. 9, 2024

(54) DYNAMIC SWITCHING FOR USER EQUIPMENT BETWEEN UNIQUE CELL AND SHARED CELL OPERATING MODES BASED ON APPLICATION TRAFFIC

(71) Applicant: Cisco Technology, Inc., San Jose, CA (US)

(72) Inventors: Srinath Gundavelli, San Jose, CA (US); Indermeet Singh Gandhi, San Jose, CA (US); Mark Grayson, Maidenhead (GB); Arun G. Khanna, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,841

(22) Filed: May 17, 2021

(65) Prior Publication Data

US 2022/0369163 A1 Nov. 17, 2022

(51) Int. Cl.
*H04W 28/08* (2023.01)
*H04W 28/086* (2023.01)
(Continued)

(52) U.S. Cl.
CPC ... *H04W 28/0925* (2020.05); *H04W 28/0268* (2013.01); *H04W 28/0862* (2023.05);
(Continued)

(58) Field of Classification Search
CPC ......... H04W 28/0925; H04W 28/0268; H04W 28/0812; H04W 28/24; H04W 72/046; H04W 88/06
See application file for complete search history.

(56) References Cited

U.S. PATENT DOCUMENTS

2013/0003695 A1* 1/2013 Nylander ........ H04W 36/00837
370/331
2013/0235785 A1  9/2013 Sebire et al.
(Continued)

FOREIGN PATENT DOCUMENTS

CN  108235339 A  6/2018
CN  111918297 A  11/2020
(Continued)

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 16)," 3GPP TS 36.413 V16.4.0 (Jan. 2021), Technical Specification, Jan. 2021, 423 pages.
(Continued)

*Primary Examiner* — Omer S Mian
(74) *Attorney, Agent, or Firm* — Edell, Shapiro & Finnan, LLC

(57) ABSTRACT

Presented herein are techniques to facilitate dynamic switching for user equipment between unique cell and shared cell operating modes based on application traffic. In one example, a method may include determining, a quality of service (QoS) to be provided for a traffic flow of a user equipment (UE) in which the mobile network includes a radio access network (RAN) including a plurality of radio units (RUs) in which at least two RUs provides a shared cell and each RU provides a unique cell; identifying an operating mode for the UE based on the QoS in which the operating mode indicates whether the traffic flow is to be communicated using a shared cell or a unique cell operating mode; and causing the UE to communicate the traffic flow using the shared cell the unique cell operating mode.

20 Claims, 9 Drawing Sheets

(51) Int. Cl.
  *H04W 28/02*  (2009.01)
  *H04W 28/24*  (2009.01)
  *H04W 72/044*  (2023.01)
  *H04W 88/06*  (2009.01)
(52) U.S. Cl.
  CPC ......... *H04W 28/24* (2013.01); *H04W 72/046* (2013.01); *H04W 88/06* (2013.01)

(56) References Cited

U.S. PATENT DOCUMENTS

| | | | |
|---|---|---|---|
| 2013/0237225 A1 | 9/2013 | Martin | |
| 2015/0016299 A1* | 1/2015 | Zhang | H04L 67/14 370/253 |
| 2015/0271683 A1* | 9/2015 | Yan | H04W 16/14 370/329 |
| 2015/0296449 A1 | 10/2015 | Shu et al. | |
| 2016/0037550 A1 | 2/2016 | Barabell et al. | |
| 2017/0105112 A1 | 4/2017 | Park et al. | |
| 2019/0141586 A1 | 5/2019 | Olsson et al. | |
| 2019/0223055 A1 | 7/2019 | Bor Yaliniz et al. | |
| 2020/0029338 A1 | 1/2020 | Lee et al. | |
| 2020/0045583 A1 | 2/2020 | Kim et al. | |
| 2020/0053005 A1 | 2/2020 | Balasubramanian et al. | |
| 2020/0053622 A1 | 2/2020 | Huang-Fu et al. | |
| 2020/0092758 A1 | 3/2020 | Youn et al. | |
| 2020/0127785 A1 | 4/2020 | Blankenship et al. | |
| 2020/0128432 A1 | 4/2020 | Youn et al. | |
| 2020/0154350 A1 | 5/2020 | Dao et al. | |
| 2020/0187085 A1 | 6/2020 | Jagannatha et al. | |
| 2020/0204252 A1 | 6/2020 | Barbieri et al. | |
| 2020/0275348 A1 | 8/2020 | Park et al. | |
| 2020/0314950 A1 | 10/2020 | Dao et al. | |
| 2020/0351702 A1* | 11/2020 | Stojanovski | H04W 28/0257 |
| 2020/0383009 A1 | 12/2020 | Qiao et al. | |
| 2020/0389835 A1 | 12/2020 | Talebi Fard et al. | |
| 2020/0412438 A1 | 12/2020 | Yang et al. | |
| 2021/0022024 A1 | 1/2021 | Yao et al. | |
| 2021/0051545 A1 | 2/2021 | Luo et al. | |
| 2021/0243839 A1* | 8/2021 | Krishnaswamy | H04W 24/04 |
| 2022/0078631 A1 | 3/2022 | Salahuddeen et al. | |
| 2022/0264415 A1 | 8/2022 | Khirallah et al. | |
| 2022/0369324 A1 | 11/2022 | Gundavelli et al. | |
| 2022/0369404 A1 | 11/2022 | Gundavelli et al. | |
| 2022/0377507 A1* | 11/2022 | Xie | H04W 76/10 |

FOREIGN PATENT DOCUMENTS

| | | | |
|---|---|---|---|
| EP | 2757844 A1 | 7/2014 | |
| WO | 2014163570 A1 | 10/2014 | |
| WO | 2017/173259 A1 | 10/2017 | |
| WO | 2020/100053 A1 | 5/2020 | |
| WO | 2021069067 A1 | 4/2021 | |
| WO | 2021071397 A1 | 4/2021 | |

OTHER PUBLICATIONS

3GPP, "3rd Generation Partnership Project; Technical Specification Group Radio Access Network; NR; Radio Resource Control (RRC) protocol specification (Release 16)," 3GPP TS 38.331 V16.4.1 (Mar. 2021), Technical Specification, Mar. 2021, 949 pages.

3GPP, "3rd Generation Partnership Project; Technical Specification Group Radio Access Network; NG-RAN; Xn application protocol (XnAP) (Release 16)," 3GPP TS 38.423 V16.4.0 (Jan. 2021), Technical Specification, Jan. 2021, 457 pages.

3GPP, "3rd Generation Partnership Project; Technical Specification Group Radio Access Network; NG-RAN; F1 application protocol (F1AP) (Release 16)," 3GPP TS 38.473 V16.5.0 (Apr. 2021), Technical Specification, Apr. 2021, 463 pages.

ShareTechnote, "5G/NR—Beam Management," https://www.sharetechnote.com/html/5G/5G_Phy_BeamManagement.html, retrieved Apr. 26, 2021, 14 pages.

Patel, et al., "5G meets Time Sensitive Networking," https://www.ericsson.com/en/blog/2018/12/5g-meets-time-sensitive-networking, Dec. 18, 2018, 7 pages.

O-RAN Alliance, "O-RAN Fronthaul Control, User and Synchronization Plane Specification 5.0," O-RAN.WG4.CUS.0-v05.00, Technical Specification, Nov. 2020, 291 pages.

Metaswitch, "What is 5G beamforming, beam steering and beam switching with massive MIMO," https://www.metaswitch.com/knowledge-center/reference/what-is-beamforming-beam-steering-and-beam-switching-with-massive-mimo, retrieved Apr. 26, 2021, 6 pages.

Cisco, "Operator Specific QCI," MME Administration Guide, StarOS Release 21.20, https://www.cisco.com/c/en/us/td/docs/wireless/asr_5000/21-20_6-14/MME-Admin/21-20-mme-admin/21-17-MME-Admin_chapter_01000001.html, Jul. 2020, 6 pages.

3GPP, "3rd Generation Partnership Project; Technical Specification Group Core Network and Terminals; Non-Access-Stratum (NAS) protocol for 5G System (5GS); Stage 3; (Release 17)," 3GPP TS 24.501 V17.2.1 (Apr. 2021), Technical Specification, Apr. 2021, 758 pages.

3GPP, "3rd Generation Partnership Project; Technical Specification Group Services and System Aspects; System architecture for the 5G System (5GS); Stage 2 (Release 17)," 3GPP TS 23.501 V17.0.0 (Mar. 2021), Technical Specification, Mar. 2021, 489 pages.

Wikipedia, "Cell Global Identity," https://en.wikipedia.org/wiki/Cell_Global_Identity, Jan. 2020, 3 pages.

3GPP, "3rd Generation Partnership Project; Technical Specification Group Radio Access Network; NR; Radio Resource Control (RRC) protocol specification (Release 16)," 3GPP TS 38.331 V16.3.1 (Jan. 2021), Technical Specification, Jan. 2021, 932 pages.

3GPP, "3rd Generation Partnership Project; Technical Specification Group Radio Access Network; NR; NR and NG-RAN Overall Description; Stage 2 (Release 16)," 3GPP TS 38.300 V16.5.0 (Mar. 2021), Technical Specification, Mar. 2021, 151 pages.

Techplayon, "5G NR Physical Cell ID (PCI) Planning," https://www.techplayon.com/5g-nr-physical-cell-id-pci-planning/, Nov. 2019, 4 pages.

3GPP, "3rd Generation Partnership Project; Technical Specification Group Services and System Aspects; Security architecture and procedures for 5G system (Release 17)," 3GPP TS 33.501 V17.1.0 (Mar. 2021), Technical Specification, Mar. 2021, 256 pages.

3GPP, "3rd Generation Partnership Project; Technical Specification Group Services and System Aspects; Policy and charging control framework for the 5G System (5GS); Stage 2 (Release 17)," 3GPP TS 23.503 V17.0.0 (Mar. 2021), Technical Specification, Mar. 2021, 128 pages.

Derham, et al., "3GPP WLAN integration in 5G System—Release 17," IEEE 802.11-19/1215r0, https://mentor.ieee.org/802.11/dcn/19/11-19-1215-00-AANI-3gpp-wlan-integration-in-5g-system-rel-17.pptx, Jul. 2019, 11 pages.

3GPP, "3rd Generation Partnership Project; Technical Specification Group Radio Access Network; Evolved Universal Terrestrial Radio Access (E-UTRA) and NR; Multi-connectivity; Stage 2 (Release 16)," 3GPP TS 37.340 V16.5.0 (Mar. 2021), Technical Specification, Mar. 2021, 84 pages.

O-RAN Alliance, "O-RAN Fronthaul Working Group Control, User and Synchronization Plane Specification 3.0," O-RAN.WG4.CUS.0-v03.00, Technical Specification, Mar. 2020, 253 pages.

International Search Report and Written Opinion in counterpad International Application No. PCT/US2022/028716, dated Aug. 19, 2022, 17 pages.

Fred Anderson, et al., "VRAN Capacity Enhancement Solution by Radio Unit Self-Discovery and Self-Management," Technical Disclosure Commons, Apr. 2022, 10 pages.

* cited by examiner

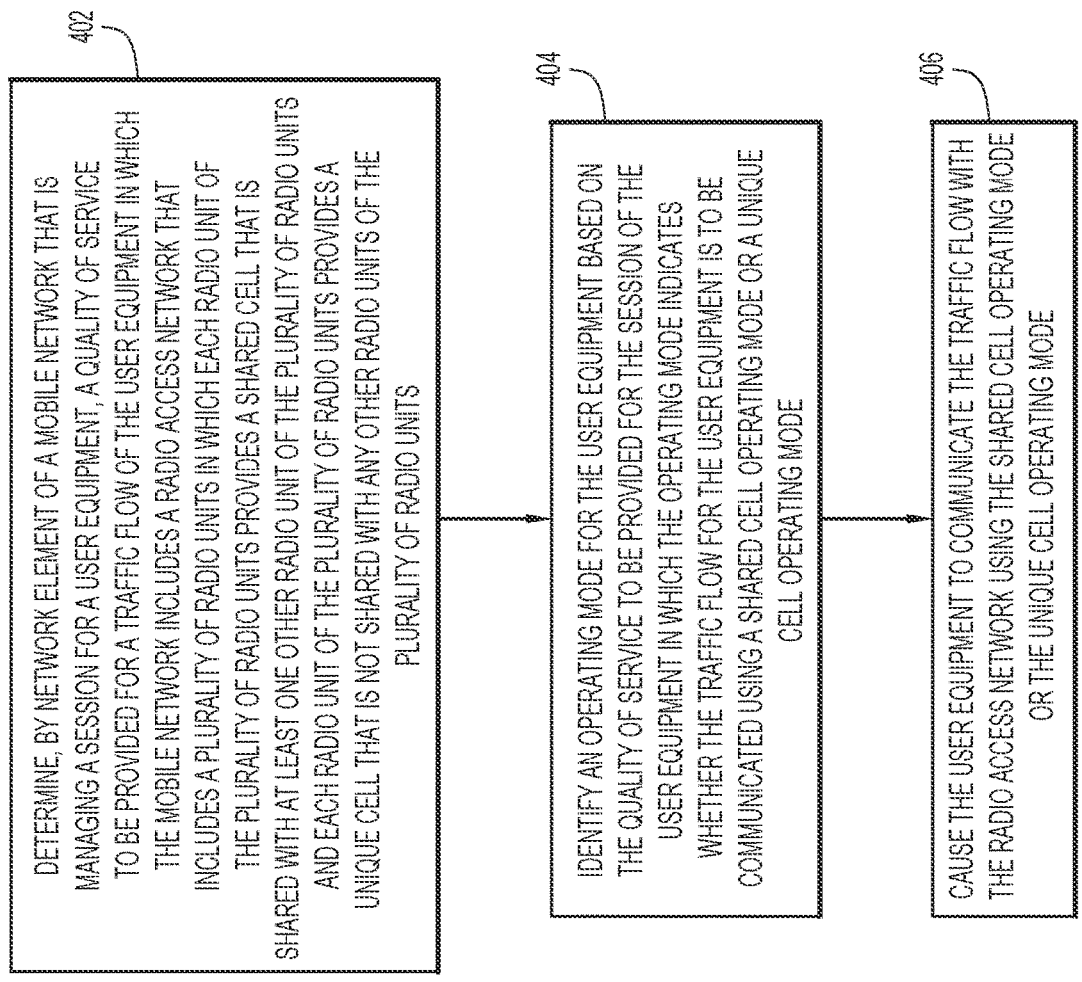

DYNAMIC SWITCHING FOR USER EQUIPMENT BETWEEN UNIQUE CELL AND SHARED CELL OPERATING MODES BASED ON APPLICATION TRAFFIC

TECHNICAL FIELD

The present disclosure relates to network equipment and services.

BACKGROUND

Networking architectures have grown increasingly complex in communications environments, particularly mobile networking environments. In particular, virtualized Radio Access Network (vRAN) architectures have been developed to provide radio coverage for mobile networks. However, there are significant challenges in managing radio access for vRAN architectures in order to provide services for user equipment.

BRIEF DESCRIPTION OF THE DRAWINGS

FIG. 4 is a flow chart depicting a method according to an example embodiment.

DESCRIPTION OF EXAMPLE EMBODIMENTS

Overview

Figure 1:
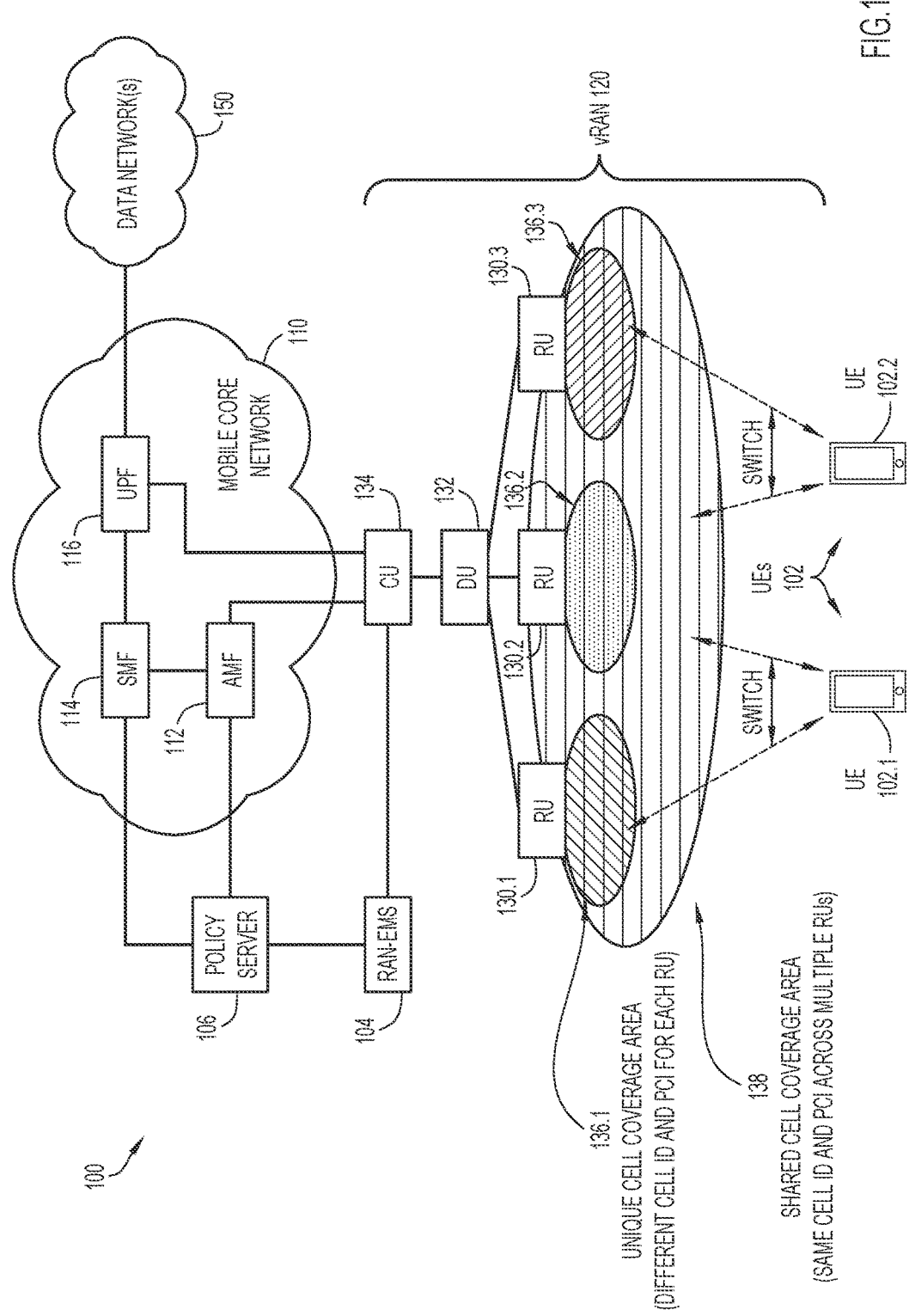
FIG. 1 is a diagram of a system in which techniques may be implemented to facilitate dynamic switching for user equipment between unique cell and shared cell operating modes based on application traffic, according to an example embodiment.

Presented herein are new techniques for dynamically moving or switching user equipment (UE) devices or, more generally, UEs, from one operating mode to another operating mode, such as between a shared cell operating mode and a unique cell operating mode based on one or more triggers from one or more network elements of a mobile core network for various UE application traffic. For a first technique, a UE can trigger a Quality of Service (QoS) flow procedure for a certain application or for a Fifth Generation (5G) QoS Identifier (5QI) value and mechanisms can be triggered by one or more mobile core network element(s) toward a 5G/New Radio (NR)-Radio Access Network (RAN) for performing operating mode selection in order to switch the UE to a particular operating mode. For a second technique, one or more user plane element(s) in the mobile core network can trigger the 5G/NR-RAN to switch the UE to a specific operating mode based the user plane element(s) detecting certain application traffic or QoS flows with a certain 5QI value and/or belonging to a certain application class. Broadly, techniques herein may facilitate an efficient use of RAN resources for different environments, such as for factory floor environments.

In one embodiment, a method is provided that may include determining, by network element of a mobile network that is managing a session for a user equipment, a quality of service to be provided for a traffic flow of the user equipment, wherein the mobile network includes a radio access network comprising a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units; identifying an operating mode for the user equipment based on the quality of service to be provided for the traffic flow of the user equipment, wherein the operating mode indicates whether the traffic flow for the user equipment is to be communicated using a shared cell operating mode or a unique cell operating mode; and causing the user equipment to communicate the traffic flow with the radio access network using the shared cell operating mode or the unique cell operating mode.

Example Embodiments

As referred to herein, an 'enterprise' or 'enterprise entity' may be considered to be a business, government, educational institution, an organization, and/or the like that may include multiple enterprise locations (or sites), such as a main campus, remote branches, any operating environment of private 5G (e.g., factory floor, port, mining facility, electric grid, etc.) and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger, for example, up to a ratio of 1:5, depending on spectrum and power regulations) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet; multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances. Cisco is a registered trademark of Cisco Technology, Inc.

Discussed herein are features associated with virtualized Radio Access Network (vRAN) architectures that may be provided for different radio accesses. In some instances, a vRAN architecture can be implemented as a disaggregated vRAN architecture that includes the split of a base station, such as a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures as discussed in further detail herein, multiple DUs (each interfacing with corresponding RU(s)) can interface with a CU-CP component and a CU-UP component.

Referring to FIG. 1, FIG. 1 is a block diagram of a system 100 in which techniques may be implemented to facilitate dynamic switching for user equipment between unique cell and shared cell operating modes based on application traffic, according to an example embodiment. System 100 includes a number of UEs 102 including a first UE 102.1 (also referred to herein as UE 102.1) and a second UE 102.2 (also referred to herein as UE 102.2), a RAN Element Management System (RAN-EMS) 104, a policy server 106, a mobile core network 110, and a vRAN 120, which may be inclusive of a disaggregated vRAN 120. In at least one embodiment, vRAN 120 may be any combination of a 4G/5G/nG-RAN. In at least one embodiment, mobile core network 110 may be representative of a 5G core network (5GC) including an Access and Mobility Management Function (AMF) 112, a Session Management Function (SMF) 114, and a User Plane Function (UPF) 116. Although not illustrated, mobile core network 110 may also include any combination of 4G/nG network elements.

The vRAN 120 may include a number of radio units (RUs) 130, including a first RU 130.1 (also referred to herein as RU 130.1), a second RU 130.2 (also referred to herein as RU 130.2), and a third RU 130.3 (also referred to herein as RU 130.3). Each of RU 130.1, 130.2 and 130.3 may interface with a distributed unit (DU) component 132 (also referred to herein as DU 132), which may further interface with a central (or centralized) unit (CU) component 134 (also referred to herein as CU 134). One or more data network(s) 150 are also shown in FIG. 1. The interface/interconnection between each RU 130.1, 130.2, and 130.3 and DU 132 is typically referred to as a fronthaul network. The interface/interconnection between DU 132 and CU 134 can be referred to as a midhaul network.

As illustrated in FIG. 1, CU 134 can further interface with RAN-EMS 104, AMF 112, and UPF 116. AMF 112 can further interface with policy server 106 and SMF 114, which may further interface with UPF 116. UPF 116 may also interface with data network(s) 150. SMF 114 may also interface with policy server 106. The interface/interconnection between CU 134 and elements of the mobile core network 110 is typically referred to as a backhaul network.

An RU, such as any of RUs 130.1-130.3, may implement any combination of a WWA (e.g., cellular) and/or WLA (e.g., Wi-Fi®) air interface for any combination of Radio Access Technology (RAT) types (sometimes referred to more generally as 'accesses') for vRAN 120 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UEs 102, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE. The coverage area of a radio node such as an eNB, gNB, RU, etc. is typically referred to as a 'cell' in which one or more UE may attach to the radio node that serves the coverage area/cell such that service connection to a network may be facilitated via the cell provided by the radio node.

A DU (also sometimes referred to as a baseband unit), such as DU 132, may provide lower level operations of the radio signal processing stack, such as Radio Link Control (RLC), Medium Access Control (MAC), and higher PHY layer operations, such as digital processing, including signal modulation and demodulation, channel encoding and decoding, and scheduling, among others. A CU, such as CU 134, may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU can be varied depending on implementation and/or configuration of a given vRAN/network architecture. A CU, such as CU 134, can also operate to DU(s), such as DU 132, for a vRAN architecture via Resource Control (RRC) functions and the control plane part of the PDCP protocol. In some embodiments, CU 134 may be further disaggregated into a CU-CP component and a CU-UP component.

In addition to radio signal processing operations, CU 134, DU 132, and RUs 130.1-130.3 may perform additional operations as discussed for various embodiments herein.

A UE, such as any of UEs 102.1 and 102.2, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks. As referred to herein, the terms 'UE' and 'UE device' can be used interchangeably.

In addition to various operations discussed for techniques herein, an AMF, such as AMF 112, may facilitate access and mobility management control/services for one or more UE, such as UEs 102, to facilitate one or more over-the-air (OTA) RF connection(s) between the UE 102 and the vRAN 120. In addition to various operations discussed for techniques herein, an SMF, such as SMF 114, may be responsible for UE Protocol Data Unit (PDU) session management (SM), with individual functions/services being supported on a per-session basis in order to facilitate data transfer(s) between a UE and one or more data network(s). Generally, a UPF, such as UPF 116, may operate as a Virtual or Virtualized Network Function (VNF) to provide packet routing and forwarding operations for user data traffic and may also perform a variety of functions such as packet inspection, traffic optimization, Quality of Service (QoS), policy enforcement and user data traffic handling (e.g., to/from data network(s) 150), and billing operations (e.g., accounting, etc.) for UE 102 sessions.

It is to be understood that other network elements may be configured for mobile core network 110 for any combination of 3G/4G/5G/nG implementations, such as, a Policy Control Function (PCF), a Policy and Charging Rules Function (PCRF), a Network Slice Selection Function (NSSF), a Network Repository Function (NRF), a Unified Data Management (UDM) service, a Unified Data Repository (UDR), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In various embodiments, the data network(s) 150 of FIG. 1 may be any combination of the Internet, an Internet Protocol (IP) Multimedia Subsystem (IMS), Ethernet network, Ethernet switching system(s), and/or the like.

Generally, RAN-EMS 104 may operate to configure, update, and/or otherwise manage resources for vRAN 120 via CU 134, DU 132, and RUs 130.1, 130.2, and 130.3 and policy server 106 may provide for maintaining/storing one or more policies for vRAN 120 and/or UEs 102 in accordance with embodiments described herein. Although illustrated as separate elements for the embodiment of FIG. 1, in some instances, RAN-EMS 104 and policy server 106 may be implemented as a combined element. For example, in some instances, RAN-EMS 104 and policy server 106 may be implemented as any combination of a Cisco® Digital Network Architecture Center (DNA-C) and/or a Cisco® RAN Element Management System (RAN-EMS) an enterprise domain controller, including Meraki® cloud, and/or the like. Meraki® is a registered trademark of Meraki, LLC, a wholly owned subsidiary of Cisco Systems, Inc. In various embodiments, policy server 106 may be any combination of an Authentication, Authorization, and Accounting (AAA) function/server, a PCF/PCRF, a HSS, a UDM, and/or the like. In one instance, policy server 106 may be implemented as a Cisco® Identity Services Engine (ISE), which may support any combination of Remote Authentication Dial-In User Service (RADIUS) and/or Diameter protocols.

A RAN, such as vRAN 120, can be configured to operate in two modes: a) unique cell configuration/operating mode, and b) shared cell configuration/operating mode. Generally, the unique cell mode is the most widely used configuration/operating mode where in which each RU operates as a unique cell with a unique cell identifier. Current public cellular networks often operate in the unique cell mode.

The shared cell mode is a special configuration/operating mode in which multiple RUs that are part of a shared cell form to become one giant cell, sometimes referred to as a 'super cell'. In this configuration mode, all the RUs that are part of this giant cell share the same cell identifiers and operate in the same frequency bands. As referred to herein, shared cells and unique cells can be referred to as cell types.

The identifiers that provide a unique identity to a cell, whether configured as unique cell or a shared cell, are Physical Cell Identifier (PCI), and Cell Global Identity (CGI). The term 'PCI' is typically used in reference to 4G/LTE implementations, whereas the term 'New Radio PCI' (NR-PCI) is typically used in reference to 5G-New Radio (5G-NR) implementations. Further, CGI for 4G/LTE implementations is referred to as Evolved Universal Mobile Telecommunications System (UMTS) Terrestrial Radio Access Network (E-UTRAN) CGI (E-CGI) and CGI for 5G-NR is referred to as NR-CGI.

A shared cell configuration has many advantages. For example, all RUs that are part of a shared cell can all serve a given UE at any given point of time. A transmitted frame from a given UE will be received by all of the RUs in their RF reachability range. The implication of this is that the UE is not required to perform handovers as it moves from one RF connection with one RU to an RF connection with another RU within the same shared cell, meaning there are no handovers within the same shared cell. In particular, handover involves the careful co-ordination and configuration of parameters in neighboring cells, including the optimization of hysteresis levels that control the triggering of the handover procedure. In contrast, by operating with a shared cell configuration, no optimization of such parameters is involved. The shared cell mode also eliminates any cell border interference issues, as all the RUs are operating in the same frequency bands. Additionally, the shared cell operating mode offers improved reliability over the unique cell operating mode, as there may be more than one RU receiving a frame transmitted by a given UE operating in the shared cell operating mode.

The shared cell configuration/operating mode can be very useful in industrial applications, such as factory floor automation applications in which Ultra-Reliable and Low-Latency Communication (URLLC) type or level service is a baseline requirement. The traffic profile of these types of services dictate a very low handover latency and high-reliability (in the order of packet losses less than 1 in million packets). The shared cell configuration mode, with its inherent spatial diversity properties is well suited for such sensitive applications.

However, the shared cell configuration also incurs a cost; the capacity of the shared cell (encompassing multiple RUs) reduces to the size of a single cell (with one RU). For example, if each RU for a deployment operating in a unique cell mode can support 'n' UE connections, the capacity of the vRAN with 'm' radio units is 'n multiplied by m'. However, for RUs operating in a shared cell mode, the capacity of the shared cell is still 'n' UE connections.

Given the above characterization of shared and unique cell modes, each with its own set of advantages and disadvantages, one challenge for implementations may include determining the preferred mode (unique cell or shared cell) for private 5G deployments targeting industrial automation use cases. A factory floor often has a mixed set of applications; some UEs/applications may involve URLLC services from the network that would benefit from shared cell connectivity, while other UEs/applications may involve basic (unique cell) connectivity services involving support for a basic traffic profile. Thus, while utilization of a shared cell may be advantageous for one set of UEs/applications, the same configuration may be an in efficient use of network resources for a large set of other applications.

Therefore, operating either just a shared cell or unique cells in these hybrid application environments may be a non-starter as neither of the two modes, on their own, may satisfy both network scale and application requirements. Thus, it would be advantageous to provide a hybrid configuration mode that encompasses both shared and unique cell configuration modes along with intelligence/logic within the network to facilitate efficient sharing of RAN resources between the two modes.

In accordance with techniques discussed herein, system 100 may provide for a new mode, referred to as a 'hybrid cell configuration mode' or, more broadly, a 'hybrid cell', for use in enterprise private 5G/nG deployments via vRAN 120. In particular, a new hybrid cell approach is provided in which an RU/cell can be operated in both shared cell and unique cell configuration/operating modes concurrently.

Accordingly, vRAN 120, may be configured to provide 3GPP private 4G/LTE, 5G/NR, and/or CBRS mobile network services via mobile core network 110 functions (e.g., EPC/5GC functions), along with CU 134, DU 132, and respective RUs 130.1, 130.2, and 130.3 providing respective unique cell coverage areas 136.1 (provided by RU 130.1 in at least one embodiment), 136.2 (provided by RU 130.2 in at least one embodiment), and 136.3 (provided by RU 130.3 in at least one embodiment) and a shared cell coverage area 138 (provided by all of RUs 130.1, 130.2, and 130.3 in at least one embodiment). As referred to herein, the terms 'cell coverage area' and 'cell' may be referred to interchangeably. For example, the terms unique cell coverage area 136.1 and unique cell 136.1 may be used interchangeably, the terms unique cell coverage area 136.2 and unique cell 136.2 may be used interchangeably, the terms unique cell coverage area 136.3 and unique cell 136.3 may be used interchangeably, and the terms shared cell coverage area 138 and shared cell 138 may be used interchangeably.

Each respective unique cell coverage area 136.1, 136.2, and 136.3 is provided by each respective RU 130.1, 130.2, and 130.3 in which each unique share cell coverage area provided by each respective RU is not shared with the other RUs. As such, each respective RU 130.1, 130.2, and 130.3 broadcasts a different cell identity (ID) (i.e., CGI such as E-CGI/NR-CGI) and PCI/NR-PCI for each respective unique cell coverage area 136.1, 136.2, and 136.3.

In contrast, shared cell coverage area 138 is provided by and shared among all RUs 130.1-130.3. Thus, all RUs 130.1, 130.2, and 130.3 may broadcast a same cell ID (E-CGI/NR-CGI) and PCI/NR-PCI for the shared cell coverage area 138.

Thus, in a hybrid cell deployment, such as shown for the disaggregated vRAN 120 of FIG. 1, RUs 130.1-130.3 can be configured as hybrid cells such that they can act like a single shared cell to serve one or more UEs 102 via shared cell coverage area 138 provided across all the RUs 130.1-130.3 and, further, each respective RU 130.1, 130.2, and 130.3 can also provide each of a respective unique cell coverage area 136.1, 136.2, and 136.3. Thus, each respective RU 130.1, 130.2, and 130.3 broadcasts a different cell identity (ID) (E-CGI/NR-CGI) and PCI/NR-PCI for each respective unique cell coverage area 136.1, 136.2, and 136.3 and all of RUs 130.1, 130.2, and 130.3 may broadcast a same cell ID (E-CGI/NR-CGI) and PCI/NR-PCI for the shared cell coverage area 138 that is also different from each respective unique cell E-CGI/NR-CGI and PCI/NR-PCI. The shared cell and the unique cells may share the same network identity, such as Public Land Mobile Network Identity (PLMN-ID).

As referred to herein, a unique cell may also be referred to interchangeably as a non-shared cell. Thus, the terms 'unique cell operating mode' and 'non-shared cell operating mode' can be used herein interchangeably. As shown in the embodiment of FIG. 1, three unique/non-shared cells and one shared cell are illustrated; however, it is to be understood that the example number of unique/non-shared cells and shared cells and/or the number of RUs forming a shared cell can be varied depending on implementation.

Further, it is to be understood that per-RU shared cells/coverage areas (which may be partially or wholly overlapping, as generally illustrated for unique cell coverage areas 136.1, 136.2, and 136.3), can also overlap the shared cell coverage area 138. Further, although illustrated as having no coverage gaps, in some instances RF gaps may be present for the shared cell coverage area 138. In some instances, an RU may support one or multiple shared cells. In some instances, multiple DUs and CUs may be present within system 100 in which each DU/CU can support one or more RUs also providing hybrid/non-hybrid cells. Thus, multiple shared cells can be present in system 100 in some instances. Further, the size and shape of the cells illustrated in FIG. 1 are provided for illustrative purposes only and are not meant to limit the broad scope of the embodiments discussed herein. Any size/shape of cell can be envisioned within the scope of embodiments discussed herein.

Additionally, although embodiments herein discuss that each RU 130.1, 130.2, and 130.3 operates in a hybrid configuration to provide unique and shared cell coverage areas, it is to be understood that one or more RUs for a vRAN implementation may operate in a non-hybrid mode by providing only unique cell or shared cell coverage. For example, in at least one embodiment, at least two of RUs 130.1, 130.2, and 130.3 may operate in the hybrid mode to provide both shared cell 138 and their corresponding unique cell, whereas the other of the at least two RUs may operate in a non-hybrid mode and may either provide only the shared cell 138 or only a corresponding unique cell.

Further, although UEs 102 are illustrated in FIG. 1 as being outside the coverage areas of the cells with which they are/can be connected, such illustration is provided for illustrative purposes only in order to discuss various feature of embodiments herein. It is to be understood that UEs 102 are/can be located within coverage areas of the cells with which they are connected as discussed for various embodiments herein.

In the hybrid configuration mode, vRAN 120 resources are shared between the two modes for the shared cell 138 and each corresponding unique cell 136.1, 136.2, and 136.3 provided by RUs 130.1, 130.2, and 130.3. Further, UEs 102.1 and 102.2 can operate in either a shared cell operating mode or a unique cell operating mode, as directed by the mobile core network 110 in accordance with embodiments herein.

In one instance for an enterprise private vRAN implementation, selection of an operating mode for a UE can be based on a static enterprise policy, such as based on the device IMEI or some other grouping in the enterprise policy system, or based on a Subscriber Identification Module (SIM) configuration in which a given operating mode (shared cell or unique cell) is configured for a SIM profile for the UE and the UE connects to the RAN cell type matching the mode. While this approach of binding devices statically to one of the two configuration/operating modes may be sufficient for many deployments, the same may be inefficient for certain other deployments.

For example, a UE may utilize shared cell configuration/operating mode when it is using a certain mission critical application and may not utilize the shared cell operating mode when that application is no longer in use, or vice-versa.

Further, a UE can utilize different beam resources in a shared cell operating mode versus a unique cell operating mode based on application traffic flow(s) for the UE. For example, mission critical or latency sensitive traffic flows may benefit from access to broadcast beam resources, whereas traffic flows associated with non-real-time IoT applications may utilize single beam resources.

Generally, a beamformed system can use a plurality of antenna elements to adapt the composite antenna gain pattern generated by the antenna elements. The system can apply a set of amplitude and phase weights to the signals applied to individual antenna elements to direct the antenna main lobe pattern and/or side lobes and/or nulls towards specific azimuth and/or elevation angles. The use of specific azimuths and/or elevation angles can be used to beneficially direct radiated energy and receive energy to/from locations of specific user devices, in preference to other locations. Opportunistically, then serving a plurality of devices (e.g., UE 102.1 and 102.2), the radiation pattern used to serve independent devices can generate a high degree of orthogonality between the channels used to serve individual devices. This allows multiple devices to be served simultaneously, using spatial multiplexing to simultaneously direct radiated energy towards a first device using a first set of antenna weights and towards a second device using a second set of antenna weights.

The individual channels are sensed using a system that monitors channel state information from individual devices. Channel information sensed from a plurality of devices, such as UE 102.1 and 102.2, can be used to optimally select which devices to serve at a particular instance out of the total available set of devices. In a time-division duplex (TDD) system, the reciprocity of channel state information between the down-link and the up-link permits channel state information to be derived by examining received signals in the up-link and apply the derived information in determining the optimum antenna weights for operation in the down-link. In the 5G new radio (NR) system, sounding reference signals (SRS) are transmitted by a 5G device (e.g., a particular UE) and used to monitor the uplink channel state.

Beamforming offers benefits for devices where channel state is known. This means channel state for devices in the connected state can be continually updated and the composite beam pattern adapted accordingly. The periodicity of updates is limited by the period of updates to channel state information. In a TDD system, this may be limited by opportunities of devices in the connected state to send uplink information. Still in other frequency division duplex (FDD) systems, this may be limited by the periodicity of sending specific measurement reports that report information pertaining to the downlink channel state.

In certain environments, there will be a high degree of temporal correlation between successive estimation of channel state. Example of such environments can include when serving slow moving devices operated by pedestrian users. Being able to detect that channel state information exhibits a high temporal correlation allows the composite beams to be constructed with a high degree of directivity. Such beams are known as fine beams, where the elevation and/or azimuth arc is reduced to focus on a specific location. In other environments, there may be a low degree of temporal correlation between successive estimation of channel state. Examples of such environments can include when serving fast moving devices operated in a vehicular environment. Being able to detect that channel state information exhibits a low temporal correlation allows the composite beam to be constructed with a lower degree of directivity. Such beams are known as coarse beams, where the elevation and/or azimuth arc is increased to focus on a generalized location.

Whereas beamforming offers benefit to devices in the connected state, mobile systems it is useful to be able to transition devices from the idle state into the connected state. As channel state information is unknown for devices in the idle state, various operations may be involved to assist in the idle state to connected state transitioning procedure. These operations can include using procedures that avoid the use of beamforming during the initial attachment procedure. Such a beam is referred to a broadcast beam, where the elevation and/or azimuth arc is configured to cover the complete coverage area of a particular cell. Other operations include beam sweeping, where a coarse beam is swept across the entire elevation and/or azimuth arc that corresponds to the complete coverage area of a cell in discrete steps with devices configured to repeat their initial access procedures to ensure that a procedure will coincide with coverage of any device in the idle state in any location across a cell coverage area.

During initial attachment procedures, devices such as UEs 102.1 and 102.2 can make use of special signals transmitted in the downlink including the synchronization signal block (SSB) that includes the primary synchronization signal (PSS), the secondary synchronization signal (SSS), and the Channel State Information Reference Symbols (CSI-RS).

In a disaggregated radio access network, such as vRAN 120, beamformer logic is configured for each of RU 130.1, 130.2, and 130.3 and channel state information is determined during demodulation at the DU 132. The operation of the fronthaul network between the DU 132 and each of RU 130.1, 130.2, and 130.3 can be used to signal the information to enable the beamformer logic configured for each of RU 130.1, 130.2, and 130.3 to configure appropriate beam weights.

In one embodiment, the fronthaul interface between DU 132 and each of RU 130.1, 130.2, and 130.3 may be based on the Open RAN (O-RAN) Alliance open fronthaul specification, such as O-RAN.WG4.CUS.0-v05.00, published Nov. 7, 2020. In such an embodiment, upper PHY functionality in the DU 132 may include the modulation/demodulation, scrambling/de-scrambling and channel encoding/decoding functionality, with the remainder of the physical layer functions, sometimes referred to as the lower physical layer, implemented in each of RU 130.1, 130.2, and 130.3. In an open fronthaul implementation, frequency domain in-phase and quadrature information is signaled between the DU 132 and each of RU 130.1, 130.2, and 130.3.

In order to support beamforming, the open fronthaul system may support various beamforming techniques. In one embodiment, pre-defined beams can be defined in each respective RU 130.1, 130.2, and 130.3 and DU 132 for each respective unique cell 136.1, 136.2, and 136.3. Each beam may represent a set of weights and phases applied to the set of antenna elements for each RU and can be represented by a 15-bit beam identifier (beam-ID) in which a beam-ID of zero (0) may correspond to a broadcast beam and other beam-IDs may correspond to predefined antenna patterns. The information that defines the spatial relations between different non-broadcast beam-IDs can be signaled between each of RU 130.1, 130.2, and 130.3 and DU 132. In various embodiments, the information can include whether a beam-ID corresponds to a coarse beam or a fine beam, identification of specific neighboring beam-IDs, and/or identification of any overlapping beam-IDs.

During operation, beam-IDs for each of unique cells 136.1, 136.2, and 136.3 can be signaled in messages sent between the DU 132 and each respective RU 130.1, 130.2, and 130.3 pertaining to each respective unique cell 136.1, 136.2, and 136.3. In the downlink, for example, a beam-ID for a unique cell can be signaled along with frequency domain in-phase and quadrature symbols to a given RU and can be used by the given RU to configure antenna weights when transmitting the corresponding symbols to a given UE 102.1 and/or 102.2 operating in a unique cell operating mode for a particular application traffic flow. In the uplink, a beam-ID for a unique cell can be signaled in control plane messages that configure the lower physical layer and can be received by a given RU and used to configure the antenna weights when receiving the corresponding symbols from uplink transmissions obtained from a given UE 102.1 and/or 102.2 operating in a unique cell operating mode for a particular application traffic flow.

In a shared cell, such as shared cell 138, frequency domain in-phase and quadrature symbols can be signaled to each of RUs 130.1, 130.2, and 130.3 which can then simultaneously transmit the same information. In the uplink for shared cell 138, common control plane messages are sent to each RU 130.1, 130.2, and 130.3 to configure the lower physical layer to simultaneously receive a set of symbols and signal such symbols to DU 132. Thus, it is to be understood that if a beam-ID of zero (0) is used in the signaling, then each of the plurality of RUs 130.1, 130.2, and 130.3 will use their corresponding broadcast beams for the operation of the shared cell 138. As an optimization in at least one embodiment, the beam space corresponding to a 15-bit beam-ID can be partitioned between individual RUs 130.1, 130.2, and 130.3. In such an embodiment, the beamforming RUs 130.1, 130.2, and 130.3 can effectively be operated as a single distributed multi-antenna system.

In contrast to a single RU system in which an RU is able to signal a DU information regarding the relationships between beam-IDs, in a distributed system as provided via vRAN 120 such information may be determined based on the spatial relationships between RU 130.1, 130.2, and 130.3 and, hence, may not be known a priori by an RU. Rather, the DU 132 can use frequency domain in-phase and quadrature symbols received from the RUs 130.1, 130.2, and 130.3 to determine the effective beam relations.

In one embodiment, the DU 132 can signal the individual RUs 130.1, 130.2, and 130.3 with information of which beam-ID may be used for an additional broadcast beam. For example, DU 132 may configure the RU 130.1 to use a beam-ID 1 as an additional broadcast beam, may configure the RU 130.2 to use a beam-ID 2 as an additional broadcast beam, and may configure the RU 130.3 to use beam-ID 3 as an additional broadcast beam. On initialization, DU 132 may not know the relations between beam-ID 1, beam-ID 2 and beam-ID 3. When serving a particular UE 102.1 and/or UE 102.2 operating in a shared cell operating mode for a particular application traffic flow, for example, the DU 132 can configure beam-ID 1, beam-ID 2 and beam-ID 3 to simultaneously serve the uplink reception from a particular UE and DU 132 can receive corresponding frequency domain in-phase and quadrature symbols from RU 130.1, 130.2, and 130.3. By processing these signals, DU 132 can determine the signal quality of the symbols received by the different RUs 130.1, 130.2, and 130.3 for uplink transmissions by a given UE 102.1 and/or UE 102.2 operating in a shared cell operating mode for a particular application traffic flow. For example, this processing can indicate that while RU 130.3 may receive the best quality signal from the given UE 102.1 and/or 102.2 operating in the shared cell operating mode for a particular application traffic flow, RU 130.2 may receive the second best quality. The DU 132 can therefore determine that there is a spatial beam relationship between beam-ID 3 on RU 130.3 and beam-ID 2 on RU 130.2.

After such a period of determination, DU 132 can flexibly configure the RUs 130.1, 130.2, and 130.3 to operate in a range of configurations. Using beam-ID 0, for example, the DU 132 can operate using shared cell 138 where all RUs 130.1, 130.2, and 130.3 are used to simultaneously to serve a given UE 102.1 or UE 102.2 operating in the shared cell operating mode. In another example, using beam-ID 1, beam-ID 2, or beam-ID 3, the DU 132 can operate using a broadcast from a particular RU to serve a given UE 102.1 or 102.2 operating in the shared cell operating mode. In yet another example, using a combination of beam-ID 1 and beam-ID 2, using a combination of beam-ID 1 and beam-ID 3, or using a combination of beam-ID 2 and beam-ID 3, the DU 132 can operate using a distributed beamforming system from a plurality of RU 130.1, 130.2, and/or 130.3 to serve a given UE 102.1 or UE 102.2 operating in the shared cell operating mode.

Thus, there is value in making UE operating mode selection dynamic based on one or more considerations, such as application traffic/application type utilized by a UE, for example, such that the decision logic for switching the UE between the two operating modes (i.e., between the shared cell operating mode for connecting to a shared cell and the unique cell operating mode for connecting to a unique cell) based on application usage rather than based on a static policy alone that is enforced during the time of UE association/registration/connection with a mobile core network.

In accordance with techniques discussed herein, system 100 may provide for the ability to dynamically switch UEs 102.1 and/or 102.2 from one operating mode to another (e.g., from shared cell operating mode to unique cell operating mode, and vice-versa) based on one or more triggers from one or more network elements of the mobile core network 110 based on various applications/application traffic involving UEs 102.1 and/or 102.2 for different QoS types or levels. Generally, different QoS types or levels can be associated with any combination of different QoS identifiers (e.g., 5QIs and/or QoS Class Identifiers (QCIs) for 4G implementations), different application identifiers (IDs), different application classes (e.g., Mission Critical, High Throughput, etc.), and/or the like that may be used to indicate different QoS types/levels that can be provided for one or more UE traffic flows.

In one example during operation of system 100, any time a particular UE 102.1 and/or 102.2 executes a certain mission critical operation (e.g., firmware download to an automobile/robot/etc. on a manufacturing floor involving a certain level of reliability and/or QoS), the mobile core network 110, via AMF 112 and SMF 114, can switch the particular UE 102.1 and/or 102.2 to a shared cell operating mode that suits the mission critical application. Thereafter, when the network detects that the application is no longer in use (e.g., the firmware download operation is complete), the particular UE 102.1 and/or 102.2 can be switched back to the unique cell operating mode. Switching operating modes between shared cell and unique cell operating modes for UE 102.1 and UE 102.2 is generally illustrated in FIG. 1 as dashed-line arrows between each UE and each cell type. Accordingly, techniques herein may advantageously provide for efficient use of vRAN 120 resources for different environments, such as factory floor environments.

For a first technique, as discussed in further detail below with reference to FIGS. 2A and 2B, a particular UE (e.g., UE 102.1 or UE 102.2) can initiate a QoS flow procedure for a certain application or for a 5QI value and mechanisms can be triggered by one or more mobile core network element(s), such as AMF 112 and SMF 114, toward CU 134 of vRAN 120 to facilitate operating mode selection for switching an operating mode for the particular UE 102. The first technique may be referred to herein as a UE-triggered technique to facilitate dynamic switching for a UE between unique cell and shared cell operating modes.

For a second technique, as discussed in further detail below with reference to FIGS. 3A, 3B, and 3C, UPF 116 in the mobile core network 110 can trigger the CU 134 of vRAN 120 to switch a particular UE 102 (e.g., UE 102.1 or UE 102.2) to a specific operating mode based the UPF 116 detecting certain application traffic or QoS flows with a certain 5QI value. The second technique may be referred to herein as a network-triggered technique to facilitate dynamic switching for a UE between unique cell and shared cell operating modes. Although FIGS. 2A-2B and 3A-3C are discussed with reference to 5QIs, it is to be understood that 4G QCIs may also be utilized in combination with and/or in lieu of 5QIs depending on implementation (e.g., for 4G architectures or 4G/5G/nG combined implementations).

Additional operating details are discussed with reference to FIGS. 2A-2B and 3A-3C, below. In particular, FIGS. 2A and 2B are a message sequence diagram illustrating a call flow 200 associated with the first (UE-triggered) technique to facilitate dynamic switching for a UE between unique cell and shared cell operating modes based on application traffic, according to an example embodiment. Further, FIGS. 3A, 3B, and 3C are a message sequence diagram illustrating a call flow 300 associated with the second (network-triggered) technique to facilitate dynamic switching for a UE between unique cell and shared cell operating modes based on application traffic, according to an example embodiment.

Figure 2A:
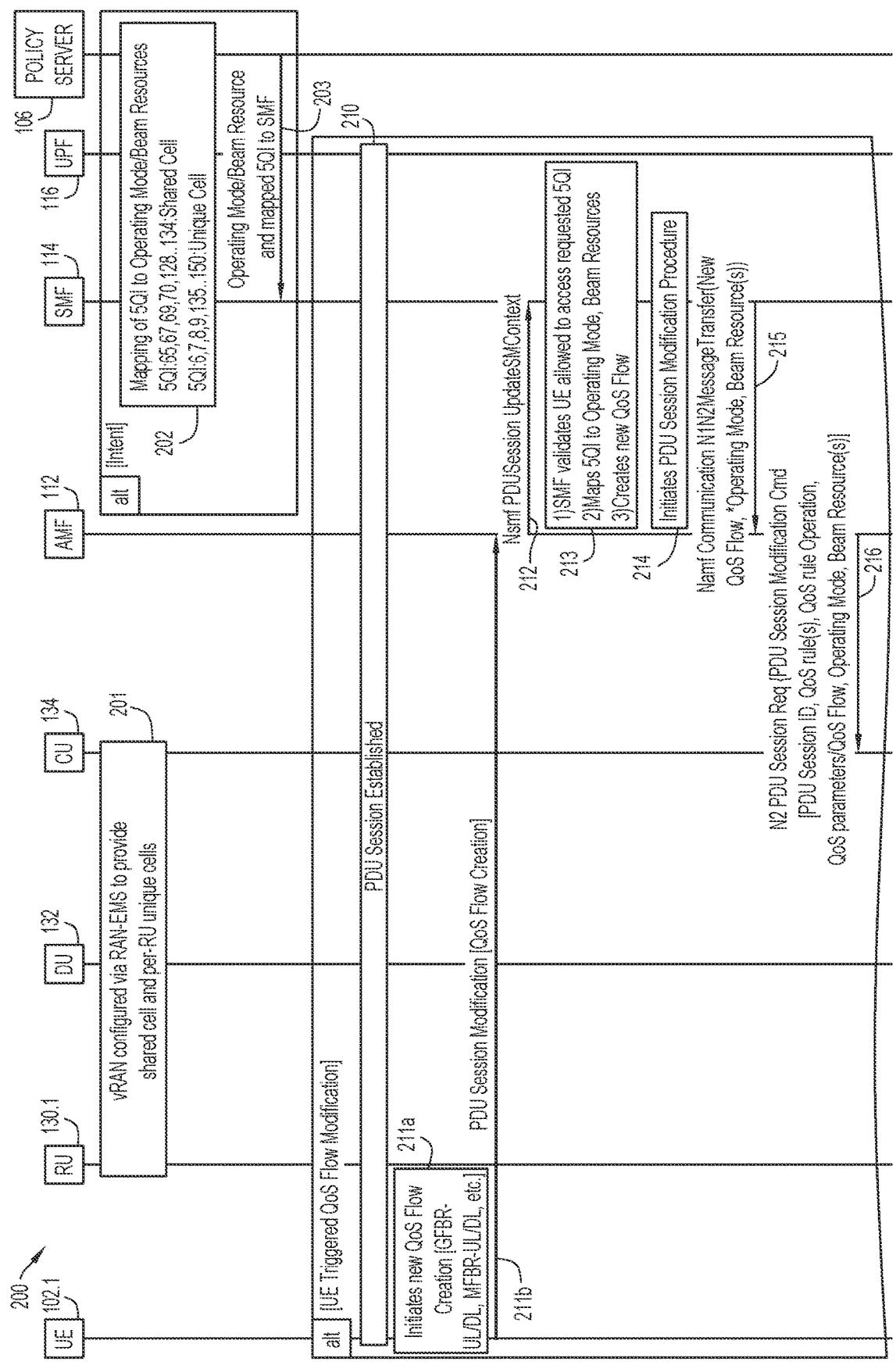
FIGS. 2A and 2B are a message sequence diagram illustrating a call flow associated with a first technique to facilitate dynamic switching for a user equipment between unique cell and shared cell operating modes based on application traffic, according to an example embodiment.
Figure 2B:
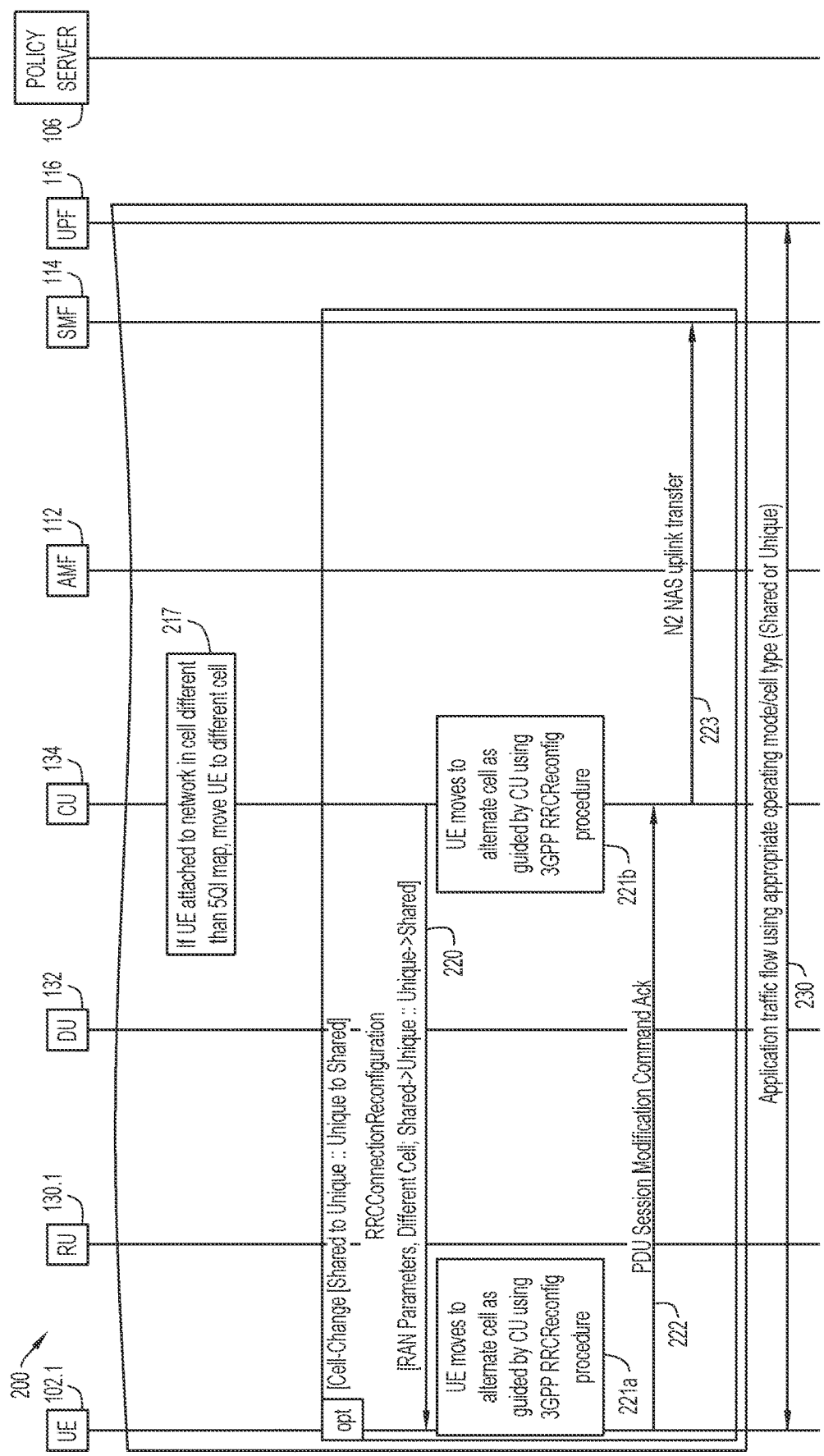
Figure 3A:
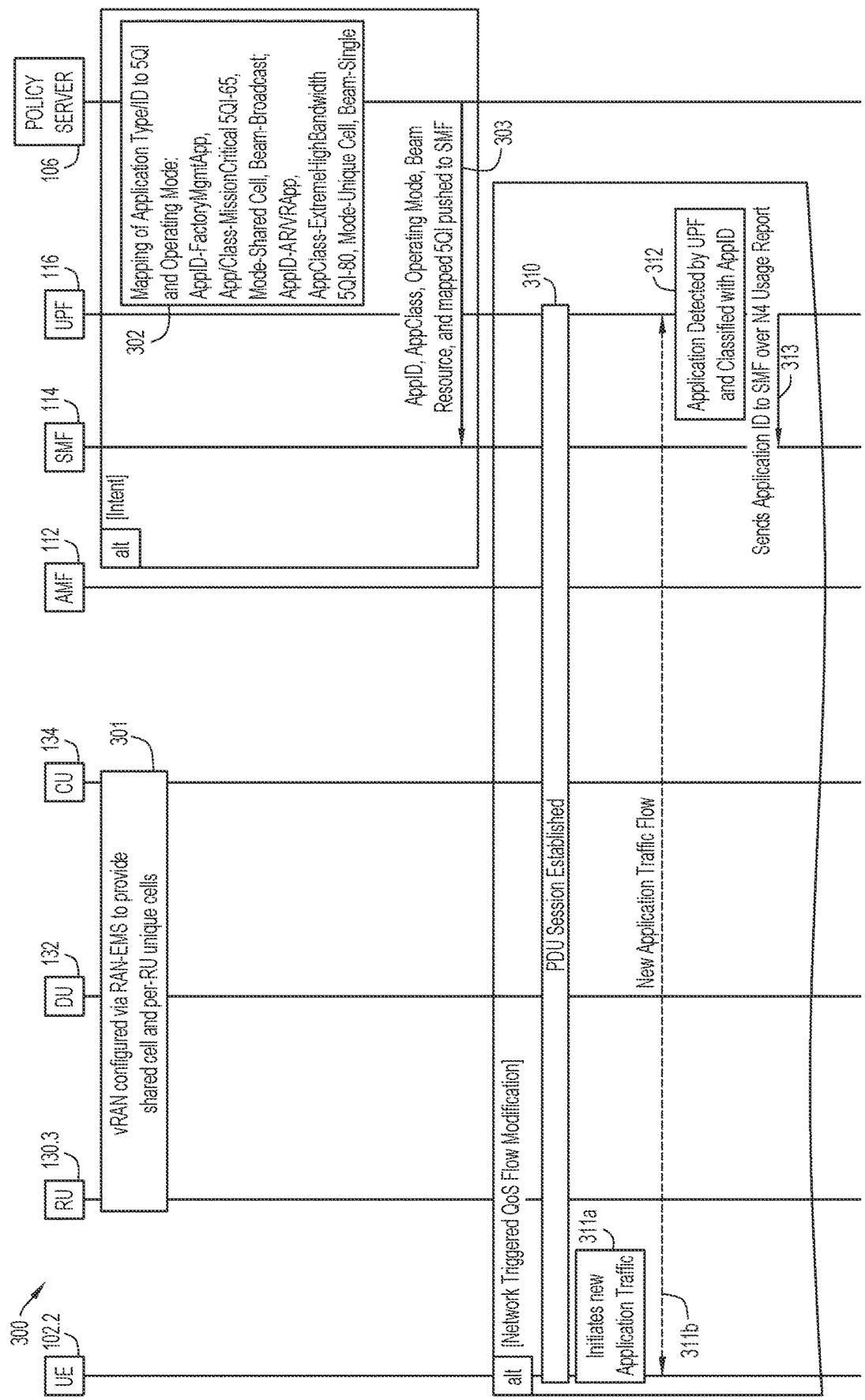
FIGS. 3A, 3B, and 3C are a message sequence diagram illustrating a call flow associated with a second technique to facilitate dynamic switching for a user equipment between unique cell and shared cell operating modes based on application traffic, according to an example embodiment.
Figure 3B:
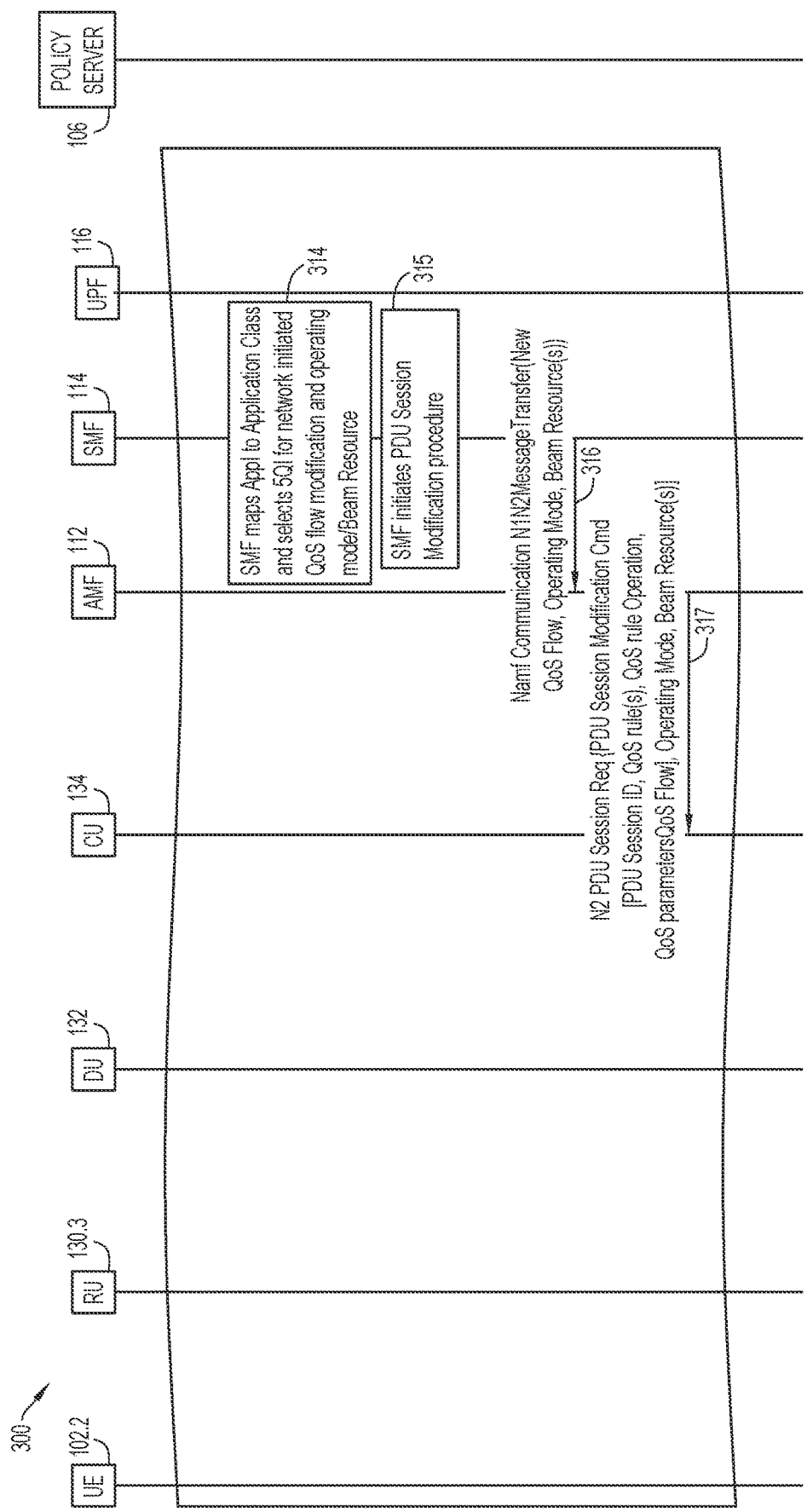
Figure 3C:
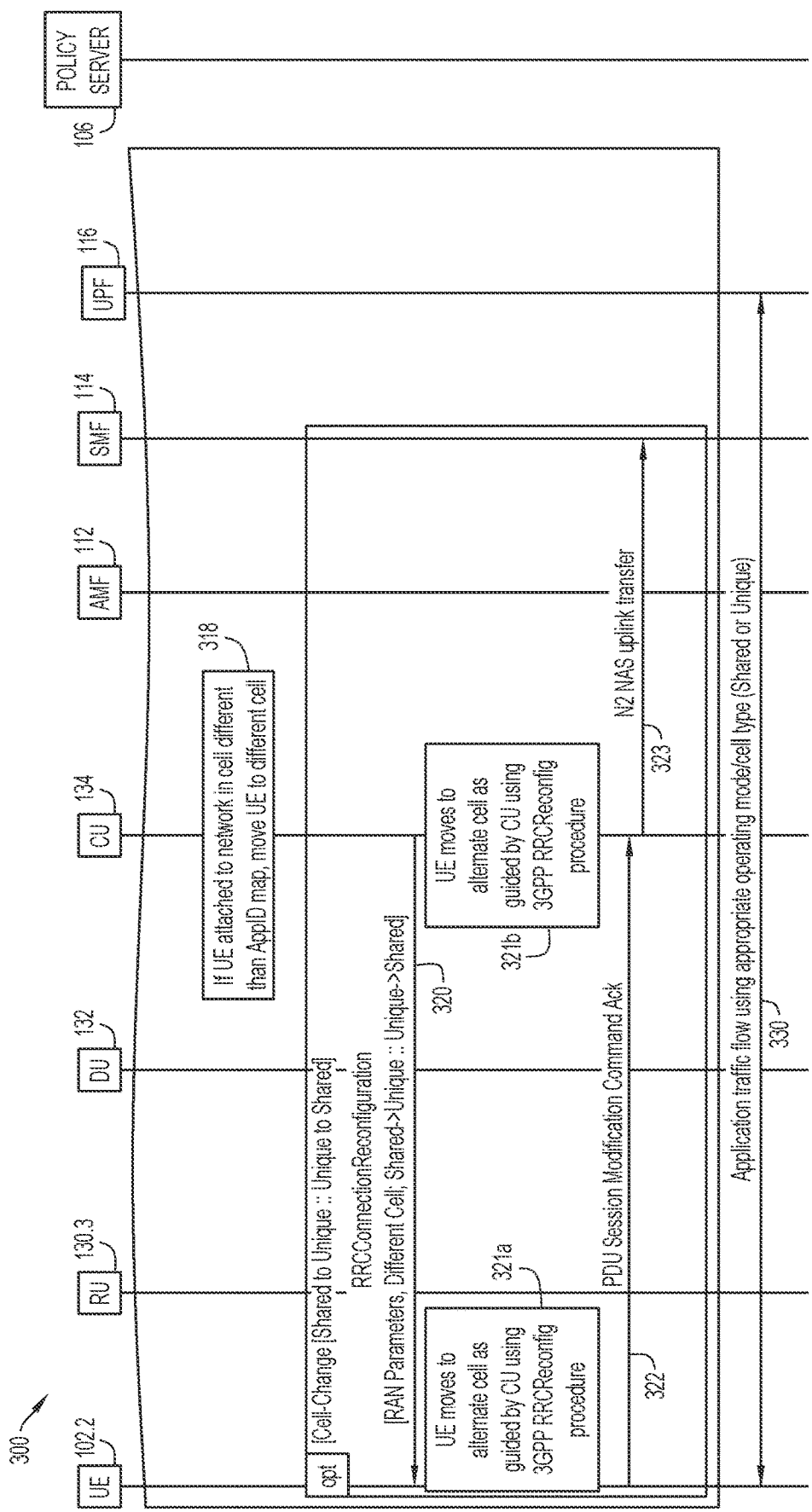

With reference to FIGS. 2A and 2B involving the first (UE-triggered) technique to facilitate dynamic UE operating mode switching, FIGS. 2A and 2B illustrate call flow 200 including UE 102.1, RU 130.1, DU 132, CU 134, AMF 112, SMF 114, UPF 116, and policy server 106. It is to be understood that operations discussed for FIGS. 2A and 2B with reference to UE 102.1 can also be performed for UE 102.2.

For the first technique involving dynamic switching for UE 102.1 between unique cell and shared cell operating modes, consider at 201 that the vRAN 120 is configured via RAN-EMS 104 (not shown in FIGS. 2A and 2B) to provide the hybrid cell configuration in order to provide both shared cell 138 and unique cells 136.1, 136.2, and 136.3. For example, DU 132 can be configured via RAN-EMS 104 to operate in two operating modes (shared cell and unique cell operating modes) concurrently, each RU 130.1, 130.2, and 130.3 that DU 132 serves can be configured to operate concurrently in a shared cell mode and a unique cell mode to provide both a unique cell and the shared cell (note, RU 130.2 and 130.3 are not shown in FIGS. 2A and 2B), and a frequency allocation along with cell ID (e.g., E-CGI/NR-CGI) and PCI (e.g., E-PCI/NR-PCI) can be provided between both modes.

Further, processing element endpoint configuration information can be provided for each RU-DU pairing. In various embodiments, a processing element endpoint configuration, depending on the transport type/network connectivity (e.g., Ethernet, IP, etc.) between DU 132 and each RU 130.1, 130.2, and 130.3, may identify any of: different (alias) Media Access Control (MAC) addresses, virtual local area network (VLAN) identity and MAC addresses; and/or User Datagram Protocol (UDP) ports and IP addresses for the DU to which each RU is assigned. A particular processing element endpoint definition configured for a given RU/DU assignment can be provided a 'name' or other identifier that can be used by other systems, nodes, etc. (e.g., RAN-EMS 104) in order to tie UE flows to DU 132.

For the configuration at 201, RAN-EMS 104 can communicate to DU 132 the operating modes of the unique cell 136.1 and the shared cell 138 to be operated by RU 130.1, the frequency allocation along with cell ID (e.g., E-CGI/NR-CGI) and PCI (e.g., E-PCI/NR-PCI) for each cell, and pairing information for the processing element endpoint configuration for each of RU 130.1 and DU 132 for the RU 130.1-DU 132 pairing. For the present example, consider that unique cell 136.1 is associated with a first NR-CGI (NR-CGI #1) and a first NR-PCI (NR-PCI #1) and that shared cell 138 is associated with a second NR-CGI (NR- CGI #2) and a second NR-PCI (NR-PCI #2). Other resource information can be provided by RAN-EMS 104 to DU 132 in accordance with various embodiments described herein. Thereafter, DU 132 can communicate the NR-CGI and NR-PCI information for each cell to be provided by RU 130.1 along with the operating mode for each cell and the CU 134 can activate each cell for RU 130.1 in a shared or unique operating mode based on the configuration. Similar operations can be performed for RU 130.2 and RU 130.3 in accordance with embodiments herein.

It is to be understood that the vRAN 120 configuration is provided for illustrative purposes only and is not meant to limit the broad scope of the present disclosure. In some instances, a CU can interface with multiple DUs and/or an RU can be paired with multiple DUs. Further, as noted above, in some instances additional CUs, DUs, and RUs can be present in vRAN 120 and can interface with/be paired with each other in any suitable configuration.

At 202, consider that an operating mode/beam resource policy is provided for policy server 106 for mapping UE operating modes and beam resources to QoS types/levels that can be identified using 5QI values. Thus, the policy may represent the intent of an enterprise entity to realize different operating modes (shared cell or unique cell) for various enterprise devices (e.g., UEs 102), applications, and/or enterprise use cases (e.g., factory floor, branch office, etc.). Various 5QI values are specified by 3GPP Technical Specification (TS) 23.501 Section 5.7.4, for example. In various embodiments, the configuration can be provided by a network administrator and/or through an exchange with another policy server/database that may be present in system 100. For the present example, consider that 5QI values 65, 67, 69, 70, and 128 through 134 are mapped to/associated with the shared cell operating mode and 5QI values 6, 7, 8, 9, and 135 through 150 are mapped to/associated with the unique cell operating mode. Generally, 5QI values 128 through 254 are non-standardized 5QI values that can be utilized for operator and/or vendor specific use-cases/configurations. It is to be understood that the example 5QI mapping is provided for illustrative purposes only and is not meant to limit the broad scope of the present disclosure. Virtually any 5QI value(s) can be mapped to shared or unique cell operating mode(s) and/or beam resource information and can be included in a UE operating mode/beam resource policy configured for a policy server in accordance with embodiments herein.

The policy server 106 can further be configured with beam resource information permitting access to beam resources provided by RUs 130.1, 130.2, and 130.3 for different 5QI values. Generally, the allocation of a 5QI value to beam resources can be used to select (as discussed using techniques described herein) which beam(s) can be used for serving a particular UE operating a particular application involving a particular 5QI value.

In at least one embodiment, beam resource information configured for policy server 106 can include different applications and/or 5QI values mapped to/associated with different beams resources. For example, latency sensitive applications/5QI values, such as Ultra-Reliable and Low-Latency Communication (URLLC) type applications, Time Sensitive Network (TSN) applications, etc. can be mapped to enable access to broadcast beam resources. Further, IoT applications, non-latency sensitive applications, high throughput applications, etc. and 5QI values associated with such applications can be mapped to enable access to single beam (e.g., non-broadcast) resources. Further, applications that are determined to be associated with high mobility (e.g., moving across different locations while utilizing an application) may be mapped to enables access to coarse beam resources. Still further, applications that are determined to have semi-static mobility (e.g., not moving locations for periods of time) and/or are slowly moving may be mapped to enable access to fine beam resources.

In a shared RU configuration, such beam resource policies can help to ensure that a device using a URLLC application is served using a shared cell that operates using broadcast beam resources, originating from overlapping RUs, thus, ensuring the most consistent service across the service area. Further, other devices using IoT applications can be served using single beam-IDs originating from a single RU, thus ensuring optimized use of frequency resources.

In another embodiment, beam resources can be mapped to/associated with different cell operating modes. For example, broadcast beam resources can be mapped to the shared cell operating mode such that UEs operating in the shared cell mode can access broadcast beam resources and single beam resources can be mapped to the unique cell operating mode such that UEs operating in the unique cell operating mode can be served by single beam-IDs originating from a single RU. Thus, although various examples herein discuss configuring different beam resources to different applications and/or 5QI/QCI values, more broadly, different beam resources can be configured on a per-operating mode level, such that certain beam resources can be configured for the shared cell operating mode (e.g., broadcast beam resources) and certain beam resources can be configured for the unique cell operating mode (e.g., single beam resources).

At 203, the operating mode/beam resource policy is sent from policy server to (e.g., pushed or pulled) to SMF 114

At 210 for the UE-triggered QoS flow modification technique, consider that a Protocol Data Unit (PDU) session is established for UE 102.1 with the mobile core network 110 (e.g., AMF 112/SMF 114/UPF 116) via RU 130.1 utilizing a first operating mode for UE 102.1. The PDU session is assigned a PDU session ID. For example, UE 102.1 can establish the PDU session at 210 utilizing the shared cell operating mode for connecting to shared cell 138 provided via RU 130.1 or utilizing the unique cell operating mode for connecting to unique cell 136.1 provided via RU 130.1. In various embodiments, a UE, such as UE 102.1 can initiate a connection with a mobile core network, such as mobile core network 110, utilizing an operating mode (shared cell or unique cell) as selected by the UE, utilizing an operating mode as configured for the UE by an enterprise (e.g., via Subscriber Identification Module (SIM) profile attributes defining a preferred operating mode for the UE), combinations thereof, and/or the like. The CU 134 can identify that UE 102.1 is connected to a shared cell or a unique cell based on the RRC signaling with UE 102.1 during the PDU session creation. Various example details are discussed with reference to FIGS. 2A-2B considering different operating modes through which the UE 102.1 may connect to the vRAN 120/mobile core network 110.

At 211*a* and 211*b*, consider that UE 102.1 initiates a new QoS flow creation procedure for a traffic flow associated with a particular application that may be associated with any combination of QoS parameters, such as Uplink (UL)/Downlink (DL) Guaranteed Flow Bit Rate (GFBR-UL/DL), UL/DL Maximum Flow Bit Rate (MFBR-UL/DL), Allocation and Retention Priority (ARP), etc., as generally specified in 3GPP TS 24.501, Section 6.4.2. If the UE 102.1 is requesting a new QoS traffic flow, it can sends an N1-PDU Session Modification message including the bit indicating a new QoS Flow Identifier (QFI) is to be assigned to the new traffic flow along with any combination of QoS parameters for the new traffic (e.g., MBR values, ARP, UL/DL information, etc.) contained within the QoS flow descriptions Information Element (IE) (as specified in 3GPP TS 24.501 Section 9.11.4.12) to AMF 112. If the UE 102.1 is requesting modification of an existing QoS traffic flow, then the UE can set the QFI values to indicate 'no QoS flow identifier assigned' in the requested QoS flow descriptions IE if the QoS flow descriptions are newly created, as specified in 3GPP TS 24.501, Sec. 6.4.2.2. Otherwise, the UE can set the QFI values to the QFI values of the existing QoS flow descriptions for which QoS handling applies. Upon obtaining the session modification message, the AMF 112 determines/assigns a 5QI value for the flow based on the QoS parameters (e.g., using standards-based operations) and proceeds to update the session management (SM) context for the UE by communicating an 'NsmfPDU Session UpdateSMContext' message to SMF 114 including the 5QI value at 212.

At 213, SMF 114 validates that the UE 102.1 is allowed to access the requested 5QI value and, upon validating that the UE 102.1 is allowed to access the requested 5QI, determines the operating mode and beam resources, if applicable, associated with the 5QI value based on the mapping noted above, and creates a new QoS flow for UE 102.1. In various embodiments, the validation that UE 102.1 is allowed to access the requested 5QI value can be based on any combination of subscription information for the UE obtained by SMF 114 (e.g., from policy server 106, a UDM, etc.), one or more enterprise policies configured for the UE, and/or the like.

In one embodiment, a UE can request an operating mode as part of the QoS flow creation request. For example, the UE can include a flag, Information Element (IE), bit, etc. that identifies one of a unique cell operating mode or a shared cell operating mode as part of the QoS flow creation request.

At 214, SMF 114 initiates a PDU Session Modification procedure for the UE-triggered use case for the 5QI value and communicates a 3GPP 'Namf Communication N1N2Message Transfer' message to AMF at 215 identifying the new QoS flow, the operating mode to which the 5QI value is mapped, and any beam resource information to which the 5QI may be mapped. At 216, AMF 112 sends an N2 PDU Session Request to CU 134 including a PDU Session Modification Command, the PDU Session ID for the UE 102.1 PDU session, one or more QoS rule(s), a QoS rule operation, and QoS parameters/QoS Flow information (e.g., generally any 5QI information as specified in 3GPP TS 23.501) along with the operating mode that the UE 102.1 is to utilize for the new QoS flow and, if applicable, any beam resource information associated with the 5QI value in order to facilitate QoS treatment for the UE traffic flow. In various embodiments, the operating mode and/or beam resource(s) can be identified using any combination of a flag, Information Element (IE), bit(s), byte(s), etc. that identifies one of a unique cell operating mode or a shared cell operating mode as part of the N2 PDU Session Request.

At 217, as shown in FIG. 2B, the CU 134, determines if the cell type/operating mode (shared or unique) through which the UE 102.1 is currently connected to the network (e.g., via the PDU session established at 210) is different than the operating mode identified in the N2 PDU Session Request that is associated with the 5QI value. If the cell type/operating mode through which the UE 102.1 is currently connected to the network is not different than the operating mode identified in the N2 PDU Session Request, the operations can proceed to 230 at which the application traffic flow for UE 102.1 is communicated between UE 102.1 and UPF 116 using the appropriate operating mode/ cell type (shared or unique) provided via RU 130.1/DU 132/CU 134.

However, if the cell type/operating mode through which UE 102.1 is currently connected to the network is different than the operating mode identified in the N2 PDU Session Request, the CU 134 can initiate a cell change from shared to unique or (as represented using '::') from unique to shared based on the operating mode identified by the AMF 112. To perform an operating mode change for UE 102.1, CU 134 sends an RRC Reconfiguration procedure by sending to the UE 102.1 an RRC Connection Reconfiguration (RRCConnectionReconfiguration) message as shown at 220 that includes RAN parameters (e.g., NR-CGI/NR-PCI, frequency information, beam information, etc.) and an indication to transition the UE 102.1 from the unique cell operating mode to the shared cell operating mode (e.g., Different Cell: Unique→Shared) or an indication to transition the UE from the shared cell operating mode to the unique cell operating mode in order to move the UE from a unique cell to a shared cell or to move the UE from a shared cell to a unique cell (e.g., Different Cell: Shared→Unique). At 221a and 221b the UE 102.1 moves to the alternate cell as guided by the CU 134 using standards-based 3GPP RRC Reconfiguration (RRCReconfig) procedures, as prescribed at least by 3GPP TS 38.331.

Following the transition, UE 102.1 communicates a PDU Session Modification Command Acknowledgment (Ack) to CU 134 at 222 via the corresponding cell type provided by RU 130.1 and CU 134 communicates an N2 NAS uplink transfer message to SMF 114 at 223. Session management (SM) related IEs can be communicated between the AMF 112 and the SMF 114 for the N2 messaging between CU 134 and AMF 112.

Thereafter, the application traffic flow for UE 102.1 is communicated between UE 102.1 and UPF 116 using the appropriate operating mode/cell type (shared or unique) provided via RU 130.1/DU 132/CU 134, as shown at 230. Thus, UE 102.1 can be switched to a new operating mode (e.g., shared cell to unique cell or unique cell to shared cell) as shown in FIGS. 2A-2B utilizing the UE-triggered QoS flow modification technique as illustrated in call flow 200. When the QoS flow is deleted or when it is no longer active, the UE 102.1 can be switched back to the operating mode/ cell type that was utilized for the PDU session creation, if needed.

With reference to FIGS. 3A, 3B, and 3C involving the second, network-triggered QoS flow modification technique to facilitate dynamic UE operating mode switching, FIGS. 3A, 3B, and 3C include UE 102.2, RU 130.3, DU 132, CU 134, AMF 112, SMF 114, UPF 116, and policy server 106 as illustrated for call flow 300. It is to be understood that operations discussed for FIGS. 2A and 2B with reference to UE 102.2 can also be performed for UE 102.1.

For the second technique, consider at 301 that the vRAN 120 is configured via RAN-EMS 104 (not shown in FIGS. 3A-3C) to provide the hybrid cell configuration in order to provide both shared cell 138 and unique cells 136.1, 136.2, and 136.3. The operations at 301 can be performed similar to those as discussed above at 201 for the embodiment of FIGS. 2A-2B but may involve communicating to DU 132 the operating modes of the unique cell 136.3 and the shared cell 138 to be operated by RU 130.3, the frequency allocation along with cell ID (e.g., E-CGI/NR-CGI) and PCI (e.g., E-PCI/NR-PCI) for each cell, and pairing information for the processing element endpoint configuration for each of RU 130.3 and DU 132 for the RU 130.3-DU 132 pairing. Thereafter, DU 132 can communicate the NR-CGI and NR-PCI information for each cell to be provided by RU 130.3 along with the operating mode for each cell and the CU 134 can activate each cell for RU 130.3 in a shared or unique operating mode based on the configuration.

At 302, consider that an operating mode/beam resource policy is provided for mapping UE operating mode and beam resources to different QoS types/levels as associated with different application types that can be identified based on application identifier (IDs) for applications. Thus, the policy may represent the intent of an enterprise entity to realize different operating modes (shared cell or unique cell) for various enterprise devices (e.g., UEs 102), applications, and/or enterprise use cases (e.g., factory floor, branch office, etc.). An example application type to UE operating mode mapping is shown below in TABLE 1.

TABLE 1

Example Application Type to UE Operating Mode/Beam Resource Manning

| Application ID | FactoryMgmtApp | AR/VRApp |
|---|---|---|
| Application Class | Mission Critical | Extreme High Bandwidth |
| 5QI | 65 | 80 |
| UE Operating Mode | Shared Cell | Unique Cell |
| Beam Resource(s) | Broadcast beam | Single beam |

As illustrated in TABLE 1, different applications can be identified using an Application ID (AppID or AppId) that identifies a particular application, an application class that identifies the application class to which the particular application belongs, the 5QI for the particular application, the UE operating mode that is to be utilized for the particular application, and beam resources that the UE can access for the particular application.

For example, an example application 'FactoryMgmtApp' can belong to a 'Mission Critical' application class, can have a 5QI value of 65, is associated with the shared cell operating mode that is to be utilized by a UE operating the application, and can be associated with broadcast beam resources. Example details are also shown in TABLE 1 for an example augmented reality/virtual reality application (AR/VRApp), which can belong to an 'Extreme High Bandwidth' application class, can have a 5QI value of 80, is associated with the unique cell operating mode that is to be utilized by a UE operating the application, and can be associated with single beam resources (e.g., non-broadcast beam resources). It is to be understood that the example mapping shown in TABLE 1 is provided for illustrative purposes only and is not meant to limit the broad scope of the present disclosure. Virtually any type of application can be included in a UE operating mode/beam resource policy configured for a policy server in accordance with embodiments herein. In some embodiments, beam resources may be configured based on operating mode (e.g., shared or unique) as opposed to on a per-application level, however, any combination of beam resource policies can be envisioned within the scope of embodiments presented herein. In various embodiments, multiple applications (e.g., each having different AppIDs) can belong to the same application class, have a same 5QI, and/or have the same/similar beam resources and, therefore, can be mapped to the same operating mode.

As shown at 303, the operating mode/beam resource policy is sent from policy server 106 (e.g., pushed or pulled) to SMF 114 and the SMF 114 can store the policy for triggering dynamic switching of the operating mode of UE 102.2 based on application traffic detected for the UE, as discussed in further detail below.

At 310 for the network-triggered QoS flow modification technique, consider that a PDU session is established for UE 102.2 with the mobile core network 110 (e.g., AMF 112/ SMF 114/UPF 116) via RU 130.3 utilizing a first operating mode for UE 102.2. The PDU session is assigned a PDU session ID. For example, UE 102.2 can establish the PDU session at 310 utilizing the unique cell operating mode for connecting to unique cell 136.1 provided via RU 136.3 or utilizing the shared cell operating mode for connecting to shared cell 138 provided via RU 130.3. Various example details are discussed with reference to FIGS. 3A-3C considering different operating modes through which the UE 102.2 may connect to the vRAN 120/mobile core network 110.

At 311*a* and 311*b*, consider that UE 102.2 initiates a new application traffic flow for a particular application, such as the FactoryMgmtApp or the AR/VRApp, as shown in TABLE 1, and the traffic flow is communicated between the UE 102.2 and UPF 116. The new application traffic can include UL traffic originated by UE 102.2 or DL traffic to be communicated downstream for UE 102.2. At 312, the UPF 116 can detect that a particular application is being utilized by the UE 102.2 and the particular application can be determined/classified based on the corresponding AppID for the particular application (e.g., FactoryMgmtApp or AR/VRApp, in this example), based on a signature for the application, based on IP address information, port information, and/or the like that may facilitate determining an AppID for the particular application.

At 313, UPF 116 sends the AppID to SMF 114 using N4 usage report messaging. Continuing to 314, as shown in FIG. 3B, SMF 114 performs a lookup on the operating mode/beam resource policy using the AppID to determine the application class (e.g., Mission Critical, Extremely High Bandwidth, etc.) for the particular application, the 5QI value for the particular application, the operating mode that UE 102.2 is to utilize for the particular application, and, if applicable, beam resource information for the particular application. Based on the 5QI value, SMF 114 initiates a QoS Flow Modification procedure at 315 for the network-triggered use case and communicates an Namf Communication N1N2Message Transfer message to AMF at 316 identifying the new QoS flow, the operating mode to which the 5QI value is mapped, and, if applicable, any beam resource information to which the 5QI may be mapped.

At 317, AMF 112 sends an N2 PDU Session Request to CU 134 including a PDU Session Modification Command, the PDU Session ID for the UE 102. PDU session, one or more QoS rule(s), a QoS rule operation, and QoS parameters/QoS Flow information along with the operating mode that the UE 102.2 is to utilize for the new QoS flow and any beam resource information associated with the 5QI value.

At 318, as shown in FIG. 3C, the CU 134, determines if the cell type/operating mode (shared or unique) through which the UE 102.2 is currently connected to the network (e.g., via the PDU session established at 210) is different than the operating mode identified in the N2 PDU Session Request that is associated with the AppID. If the cell type/operating mode through which the UE 102.1 is currently connected to the network is not different than the operating mode identified in the N2 PDU Session Request, the operations can proceed to 330 at which the application traffic flow for UE 102.2 is communicated between UE 102.2 and UPF 116 using the appropriate operating mode/cell type (shared or unique) provided via RU 130.3/DU 132/CU 134.

However, if the cell type/operating mode through which UE 102.2 is currently connected to the network is different than the operating mode identified in the N2 PDU Session Request, the CU 134 can initiate a cell change from shared to unique or from unique to shared based on the operating mode identified by the AMF 112. To perform an operating mode change for UE 102.2, CU 134 sends an RRC Reconfiguration procedure by sending to the UE 102.2 an RRC-ConnectionReconfiguration message as shown at 320 that includes RAN parameters and an indication to transition the UE 102.2 from the unique cell operating mode to the shared cell operating mode (e.g., Different Cell: Unique→Shared) or an indication to transition the UE from the shared cell operating mode to the unique cell operating mode in order to move the UE from a unique cell to a shared cell or to move the UE from a shared cell to a unique cell (e.g., Different Cell: Shared→Unique). At 321$a$ and 321$b$ the UE 102.2 moves to the alternate cell as guided by the CU 134 using standards-based 3GPP RRC Reconfiguration (RRCReconfig) procedures, as prescribed at least by 3GPP TS 38.331

Following the transition, UE 102.2 communicates a PDU Session Modification Command Acknowledgment (Ack) to CU 134 at 322 via the corresponding cell type provided by RU 130.3 and CU 134 communicates an N2 NAS uplink transfer message to AMF 112 at 323. Session management (SM) related IEs can be communicated between the AMF 112 and the SMF 114 for the N2 messaging between CU 134 and AMF 112. Thereafter, the application traffic flow for UE 102.2 is communicated between UE 102.2 and UPF 116 using the appropriate operating mode/cell type (shared or unique) provided via RU 130.3/DU 132/CU 134, as shown at 330.

Thus, UE 102.2 can be switched to a new operating mode (e.g., shared cell to unique cell or unique cell to shared cell) as shown in FIGS. 3A-3C utilizing the network-triggered QoS flow modification technique. When the QoS flow is deleted or when it is no longer active, the UE 102.2 can be switched back to the operating mode/cell type that was utilized for the PDU session creation, if needed.

Referring to FIG. 4, FIG. 4 is a flow chart depicting a method 400 according to an example embodiment. In at least one embodiment, method 400 illustrates example operations that may be performed, at least in part, by an AMF, such as AMF 112, and an SMF, such as SMF 114 in order to facilitate dynamic switching for UEs between unique cell and shared cell operating modes, according to an example embodiment.

Consider, at 402 that the method may include determining, by network element of a mobile network that is managing a session (e.g., AMF 112) for a user equipment (e.g., any UE 102), a quality of service to be provided for a traffic flow of the user equipment in which the mobile network includes a radio access network (e.g., vRAN 120) that includes a plurality of radio units in which each radio unit of the plurality of radio units provides a shared cell that is shared with at least one other radio unit of the plurality of radio units and each radio unit of the plurality of radio units provides a unique cell that is not shared with any other radio unit of the plurality of radio units.

At 404, the method may include identifying an operating mode for the user equipment based on the quality of service to be provided for the traffic flow of the user equipment in which the operating mode indicates whether the session for the user equipment is to be communicated using a shared cell operating mode or a unique cell operating mode.

In one instance, the method may further include configuring a policy (e.g., via policy server 106) with policy information identifying a first quality of service that is to be communicated using the shared cell operating mode and identifying second quality of service that is to be communicated using the unique cell operating mode. In one instance, the method may include configuring the policy with first beam resource information indicating first beam resources that can be associated with the first quality of service and second beam resources that can be associated with the second quality of service.

In one instance, the first quality of service can be associated with one or more first quality of service identifiers (e.g., a first set of one or more 5QIs) and the second quality of service can be associated with one or more second quality of service identifiers (e.g., a second set of one or more 5QIs). For such instances, the determining at 402 may include obtaining a session modification request from the user equipment (e.g., a PDU Session Modification Request, as shown at 211 of FIG. 2A) to create the traffic flow associated with the quality of service in which the session modification request includes quality of service information, and the operating mode can be identified at 404 based on the quality of service information.

In one instance, the first quality of service can be associated with a first application class and the second quality of service can be associated with a second application class. For such instances, the determining at 402 can include detecting application traffic for the user equipment associated with a particular application class, and the operating mode can be identified at 404 based, at least in part, on the particular application class.

At 406, the method may include causing the user equipment to communicate the traffic flow with the radio access network using the shared cell operating mode or the unique cell operating mode. In one instance, causing the user equipment to communicate the traffic flow with the radio access network can include switching the operating mode of the user equipment between the shared cell operating mode and the unique cell operating mode.

Figure 5:
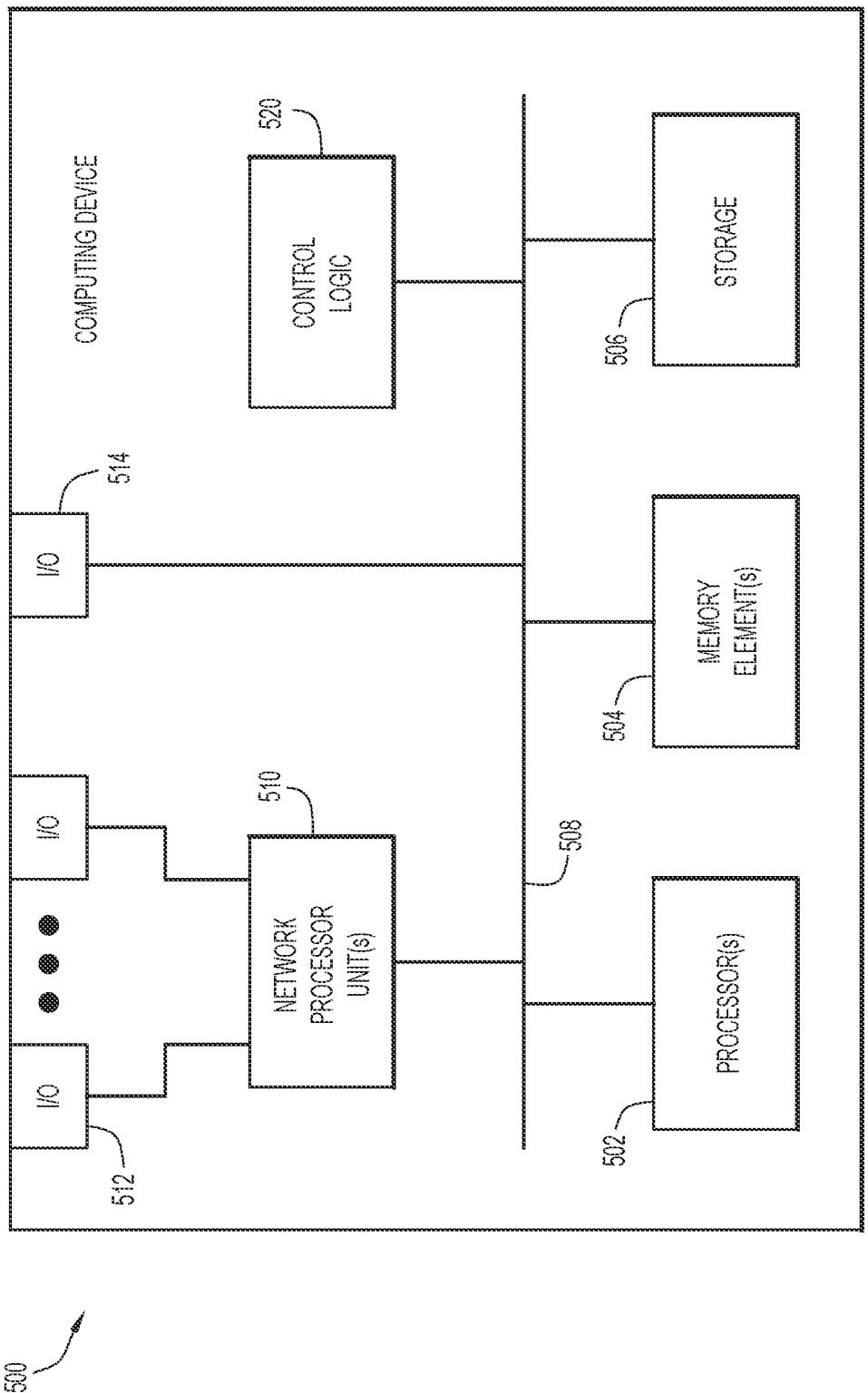
FIG. 5 is a hardware block diagram of a computing device that may perform functions associated with any combination of operations, in connection with the techniques discussed herein.

Referring to FIG. 5, FIG. 5 illustrates a hardware block diagram of a computing device 500 that may perform functions associated with operations discussed herein. In various embodiments, a computing device or apparatus, such as computing device 500 or any combination of computing devices 500, may be configured as any entity/entities as discussed herein in order to perform operations of the various techniques discussed herein, such as, for example any of AMF 112, SMF 114, RAN-EMS 104, CU 134, DU 132, and/or any other network element discussed for embodiments herein.

In at least one embodiment, computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 520 can include instructions that, when executed, cause processor(s) 502 to perform operations including determining a quality of service to be provided for a session of the user equipment; identifying an operating mode for the user equipment based on the quality of service to be provided for the session of the user equipment in which the operating mode indicates whether the session for the user equipment is to be communicated using a shared cell operating mode or a unique cell operating mode; and causing the user equipment to communicate with the radio access network using the shared cell operating mode or the unique cell operating mode.

Figure 6:
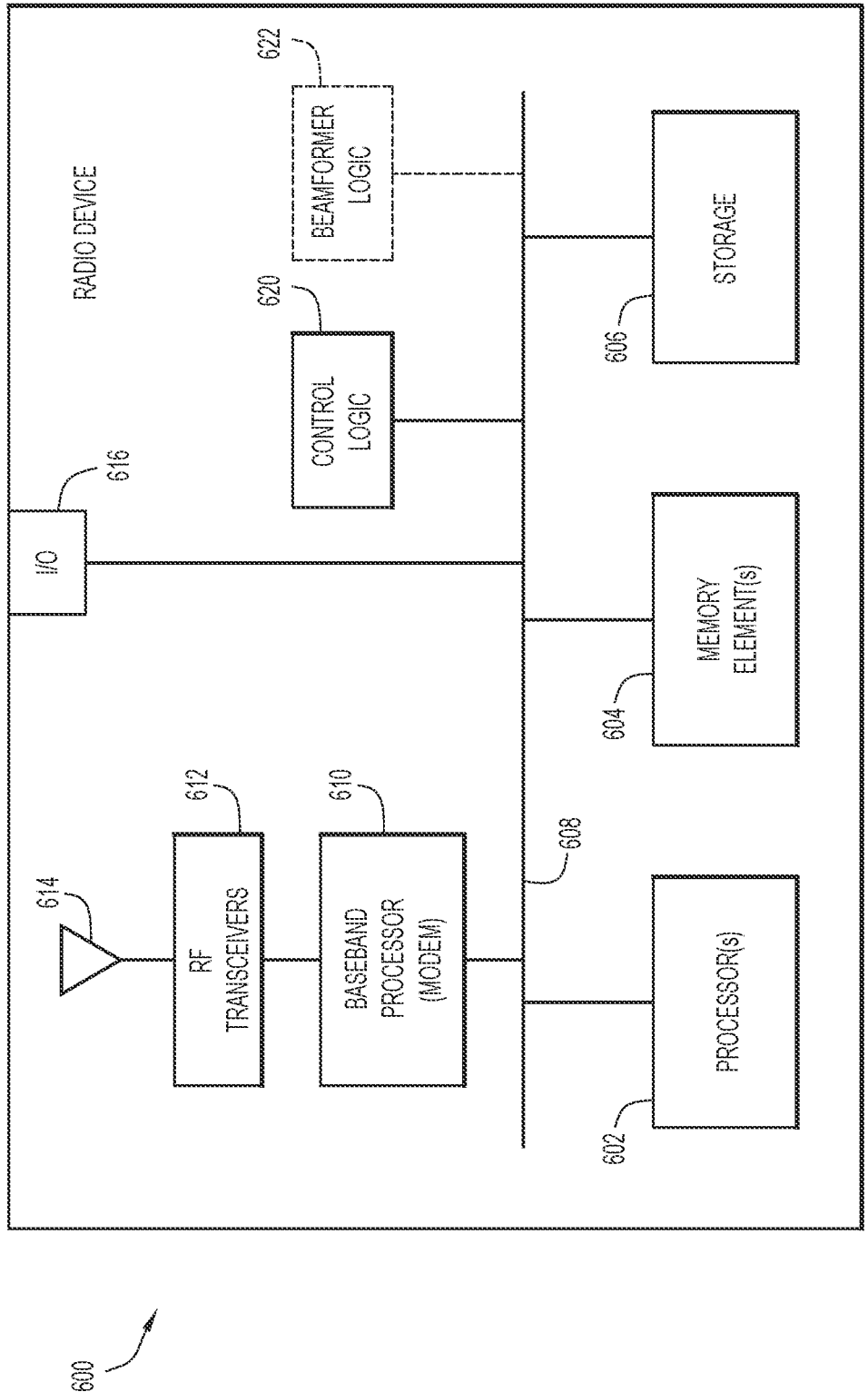
FIG. 6 is a hardware block diagram of a radio device that may perform functions associated with any combination of operations, in connection with the techniques discussed herein.

Referring to FIG. 6, FIG. 6 illustrates a hardware block diagram of a radio device 600 that may perform functions associated with operations discussed herein. In various embodiments, a radio device or apparatus, such as radio device 600 or any combination of radio devices 600, may be configured as any radio node/nodes as depicted herein in order to perform operations of the various techniques discussed herein, such as operations that may be performed by any of an RU (e.g., any of RU 130.1, 130.2, and 130.3) or a UE (e.g., any of UEs 102.1 and 102.2).

In at least one embodiment, radio device 600 may be any apparatus that may include one or more processor(s) 602, one or more memory element(s) 604, storage 606, a bus 608, a baseband processor or modem 610, one or more radio RF transceiver(s) 612, one or more antennas or antenna arrays 614, one or more I/O interface(s) 616, and control logic 620. For embodiments in which radio device 600 may be implemented as an RU, the radio device 600 may additionally include beamformer logic 622 to perform beam resource related operations, as discussed herein. In various embodiments, instructions associated with logic for radio device 600 can overlap in any manner and are not limited to the specific allocation of instructions and/or operations described herein.

The one or more processor(s) 602, one or more memory element(s) 604, storage 606, bus 608, and I/O interface(s) 616 may be configured/implemented in any manner described herein, such as described herein at least with reference to FIG. 5.

The RF transceiver(s) 612 may perform RF transmission and RF reception of wireless signals via antenna(s)/antenna array(s) 614, and the baseband processor (modem) 610 performs baseband modulation and demodulation, etc. associated with such signals to enable wireless communications for radio device 600.

In various embodiments, control logic 620 can include instructions that, when executed, cause processor(s) 602 to perform operations, which can include, but not be limited to, providing overall control operations of radio device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In various embodiments, beamformer logic 622, if implemented, can include instructions that, when executed, cause processor(s) 602 to perform beam related operations as discussed herein, which can include, but not be limited to, providing beamforming operations (e.g., transmissions, receptions, signaling, measurements, etc.); interacting with other entities, systems, etc. (e.g., DU 132); maintaining and/or interacting with stored data, information, parameters, etc. (e.g., memory element(s), storage, data structures, databases, tables, etc. storing beam-ID/beam resource information, etc.); combinations thereof; and/or the like to facilitate various operations for embodiments described herein.

The programs described herein (e.g., control logic 520/620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504/604 and/or storage 506/606 can store data, software, code, instructions (e.g., processor instructions), logic, parameters, combinations thereof, and/or the like used for operations described herein. This includes memory element(s) 504/604 and/or storage 506/606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include determining, by network element of a mobile network that is managing a session for a user equipment, a quality of service to be provided for a traffic flow of the user equipment, wherein the mobile network includes a radio access network comprising a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units; identifying an operating mode for the user equipment based on the quality of service to be provided for the traffic flow of the user equipment, wherein the operating mode indicates whether the traffic flow for the user equipment is to be communicated using a shared cell operating mode or a unique cell operating mode; and causing the user equipment to communicate the traffic flow with the radio access network using the shared cell operating mode or the unique cell operating mode.

In one instance, the method may include configuring a policy server with policy information identifying a first quality of service that is to be communicated using the shared cell operating mode and identifying a second quality of service that is to be communicated using the unique cell operating mode. More generally, policy information can identify a first quality of service that is to be communicated using the shared cell operating mode and a second quality of service that is to be communicated using the unique cell operating mode.

In one instance, the first quality of service can be associated with one or more first quality of service identifiers and the second quality of service can be associated with one or more second quality of service identifiers. In such an instance, the determining can include obtaining a session modification request from the user equipment to create a quality of service flow associated with the quality of service, wherein the session modification request includes a particular quality of service identifier, and the operating mode is identified based on the particular quality of service identifier.

In one instance, the first quality of service can be associated with a first application class and the second quality of service can be associated with a second application class. In such instances, the determining can include detecting application traffic for the user equipment associated with a particular application class, and the operating mode is identified based, at least in part, on the particular application class.

In one instance, the method can include configuring the policy server with first beam resource information indicating first beam resources that can be associated with the first quality of service and second beam resources that can be associated with the second quality of service. More generally, the policy information can further include first beam resource information indicating first beam resources that can be associated with the first quality of service and second beam resources that can be associated with the second quality of service.

In one instance, causing the user equipment to communicate with the radio access network using the shared cell operating mode or the unique cell operating mode includes can include switching the operating mode of the user equipment between the shared cell operating mode and the unique cell mode.

In summary, techniques herein may provide for dynamically switching UEs, from one operating mode to another operating mode, such as between a shared cell operating mode and a unique cell operating mode based on one or more triggers from one or more network elements of a mobile core network for various UE application traffic. For a first technique, a UE can initiate a QoS flow procedure for a certain application or a 5QI value and mechanisms can be triggered by one or more mobile core network element(s) toward a 5G/NR-RAN for performing operating mode selection in order to switch the UE to a particular operating mode. For a second technique, one or more user plane element(s) in the mobile core network can trigger the 5G/NR-RAN to switch the UE to a specific operating mode based the user plane element(s) detecting certain application traffic or QoS flows with a certain 5QI value and/or belonging to a certain application.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining policy information by a session management function of a mobile network from a policy server, wherein the mobile network includes a radio access network comprising a plurality of radio units in which each radio units of the plurality of radio units provides a shared cell that is shared with at least one other radio unit of the plurality of radio units and each radio unit of the plurality of radio units provides a unique cell that is not shared with any other radio units of the plurality of radio units and the policy information obtained by the session management function indicates whether user equipment are to utilize a shared cell operating mode or a unique cell operating mode for radio communications within the radio access network based on different application traffic of the user equipment;
   obtaining, by the session management function, an indication of particular application traffic of a particular user equipment from an access and mobility management function or a user plane function;
   identifying, by the session management function, one of the shared cell operating mode or the unique cell operating mode that the user equipment is to utilize for radio communications within the radio access network for the particular application traffic based on the policy information; and
   causing the particular user equipment to perform radio communications for the particular application traffic using the shared cell operating mode or the unique cell operating mode.

2. The method of claim 1, wherein the policy information identifies one or more first quality of service identifiers for application traffic that is to be communicated using the shared cell operating mode and identifies one or more second quality of service identifiers for application traffic that is to be communicated using the unique cell operating mode.

3. The method of claim 2, wherein obtaining the indication of particular application traffic of the particular user equipment includes obtaining, from the access and mobility management function, an indication of a session modification request for the user equipment to create a session for the particular application traffic, wherein the indication of the session modification request includes a particular quality of service identifier for the particular application traffic and the identifying includes identifying one of the shared cell operating mode or the unique cell operating mode based on the particular quality of service identifier being identified as one of the one or more first quality of service identifiers or the one or more second quality of service identifiers.

4. The method of claim 2, wherein the policy information further identifies an application class and an application identifier associated with each of the one or more first quality of service identifiers and each of the one or more second quality of service identifiers.

5. The method of claim 4, wherein obtaining the indication of particular application traffic of the particular user equipment includes obtaining, from the user plane function, a particular application identifier associated with the particular application traffic for the user equipment and the identifying includes identifying one of the shared cell operating mode or the unique cell operating mode based, at least in part, on the particular application identifier being associated with one of the one or more first quality of service identifiers or the one or more second quality of service identifiers.

6. The method of claim 2, wherein the policy information further identifies beam resource information indicating first beam resources associated with the one or more first quality of service identifiers and second beam resources associated with the one or more second quality of service identifiers.

7. The method of claim 1, wherein causing the user equipment to-perform the radio communications for the particular application traffic using the shared cell operating mode or the unique cell operating mode includes:
   switching a radio communication operating mode of the user equipment between the shared cell operating mode and the unique cell operating mode.

8. One or more non-transitory computer readable storage media encoded with instructions that, when executed by a processor, cause the processor to perform operations, comprising:
   obtaining policy information by a session management function of a mobile network from a policy server, wherein the mobile network includes a radio access network comprising a plurality of radio units in which each radio units of the plurality of radio units provides a shared cell that is shared with at least one other radio unit of the plurality of radio units and each radio unit of the plurality of radio units provides a unique cell that is not shared with any other radio units of the plurality of radio units and the policy information obtained by the session management function indicates whether user equipment are to utilize a shared cell operating mode or a unique cell operating mode for radio communications within the radio access network based on different application traffic of the user equipment;

obtaining, by the session management function, an indication of particular application traffic of a particular user equipment from an access and mobility management function or a user plane function;

identifying, by the session management function of the mobile network, one of the shared cell operating mode or the unique cell operating mode that the user equipment is to utilize for radio communications within the radio access network for the particular application traffic based on the policy information; and causing the particular user equipment to perform radio communications for the particular application traffic using the shared cell operating mode or the unique cell operating mode.

9. The media of claim 8, wherein the policy information identifies one or more first quality of service identifiers for application traffic that is to be communicated using the shared cell operating mode and identifies one or more second quality of service identifiers for application traffic that is to be communicated using the unique cell operating mode.

10. The media of claim 9, wherein obtaining the indication of particular application traffic of the particular user equipment includes obtaining, from the access and mobility management function, an indication of a session modification request for the user equipment to create a session for the particular application traffic, wherein the indication of the session modification request includes a particular quality of service identifier for the particular application traffic and the identifying includes identifying one of the shared cell operating mode or the unique cell operating mode based on the particular quality of service identifier being identified as one of the one or more first quality of service identifiers or the one or more second quality of service identifiers.

11. The media of claim 9, wherein the policy information further identifies an application class and an application identifier associated with each of the one or more first quality of service identifiers and each of the one or more second quality of service identifiers.

12. The media of claim 11, wherein obtaining the indication of particular application traffic of the particular user equipment includes obtaining, from the user plane function, a particular application identifier associated with the particular application traffic for the user equipment and the identifying includes identifying one of the shared cell operating mode or the unique cell operating mode based, at least in part, on the particular application identifier being associated with one of the one or more first quality of service identifiers or the one or more second quality of service identifiers.

13. The media of claim 9, wherein the policy information further identifies beam resource information indicating first beam resources associated with the one or more first quality of service identifiers and second beam resources associated with the one or more second quality of service identifiers.

14. A system comprising:
at least one memory element for storing data; and
at least one processor for executing instructions associated with the data, wherein executing the instructions causes the system to perform operations, comprising:

obtaining policy information by a session management function of a mobile network from a policy server, wherein the mobile network includes a radio access network comprising a plurality of radio units in which each radio units of the plurality of radio units provides a shared cell that is shared with at least one other radio unit of the plurality of radio units and each radio unit of the plurality of radio units provides a unique cell that is not shared with any other radio units of the plurality of radio units and the policy information obtained by the session management function indicates whether user equipment are to utilize a shared cell operating mode or a unique cell operating mode for radio communications within the radio access network based on different application traffic of the user equipment;

obtaining, by the session management function, an indication of particular application traffic of a particular user equipment from an access and mobility management function or a user plane function;

identifying, by the session management function, one of the shared cell operating mode or the unique cell operating mode that the user equipment is to utilize for radio communications within the radio access network for the particular application traffic based on the policy information; and causing the particular user equipment to perform radio communications for the particular application traffic using the shared cell operating mode or the unique cell operating mode.

15. The system of claim 14, wherein the policy information identifies one or more first quality of service identifiers for application traffic that is to be communicated using the shared cell operating mode and identifies one or more second quality of service identifiers for application traffic that is to be communicated using the unique cell operating mode.

16. The system of claim 15, wherein the policy information further-identifies beam resource information indicating first beam resources associated with the one or more first quality of service identifiers and second beam resources associated with the one or more second quality of service identifiers.

17. The system of claim 14, wherein causing the user equipment to-perform the radio communications for the particular application traffic using the shared cell operating mode or the unique cell operating mode includes:
switching a radio communication operating mode of the user equipment between the shared cell operating mode and the unique cell operating mode.

18. The system of claim 15, wherein obtaining the indication of particular application traffic of the particular user equipment includes obtaining, from the access and mobility management function, an indication of a session modification request for the user equipment to create a session for the particular application traffic, wherein the indication of the session modification request includes a particular quality of service identifier for the particular application traffic and the identifying includes identifying one of the shared cell operating mode or the unique cell operating mode based on the particular quality of service identifier being identified as one of the one or more first quality of service identifiers or the one or more second quality of service identifiers.

19. The system of claim 15, wherein the policy information further identifies an application class and an application identifier associated with each of the one or more first quality of service identifiers and each of the one or more second quality of service identifiers.

20. The system of claim 18, wherein obtaining the indication of particular application traffic of the particular user equipment includes obtaining, from the user plane function, a particular application identifier associated with the particular application traffic for the user equipment and the identifying includes identifying one of the shared cell operating mode or the unique cell operating mode based, at least in part, on the particular application identifier being associated with one of the one or more first quality of service identifiers or the one or more second quality of service identifiers.

* * * * *

UNITED STATES PATENT AND TRADEMARK OFFICE
CERTIFICATE OF CORRECTION

| | | |
|---|---|---|
| PATENT NO. | : 11,871,271 B2 | |
| APPLICATION NO. | : 17/321841 | |
| DATED | : January 9, 2024 | |
| INVENTOR(S) | : Srinath Gundavelli et al. | |

It is certified that error appears in the above-identified patent and that said Letters Patent is hereby corrected as shown below:

In the Claims

Claim 7, Column 30, Line 50, replace "equipment to-perform the radio" with --equipment to perform the radio--

Claim 16, Column 32, Line 40, replace "further-identifies beam resource" with --further identifies beam resource--

Claim 17, Column 32, Line 46, replace "equipment to-perform the radio" with --equipment to perform the radio--

Signed and Sealed this
Twenty-third Day of April, 2024

Katherine Kelly Vidal
*Director of the United States Patent and Trademark Office*